United States Patent
Hegde et al.

(10) Patent No.: US 12,078,500 B2
(45) Date of Patent: Sep. 3, 2024

(54) SOLAR-LOAD PREDICTION FOR VEHICULAR CABIN THERMAL ACTUATOR CONTROL

(71) Applicant: GM GLOBAL TECHNOLOGY OPERATIONS LLC, Detroit, MI (US)

(72) Inventors: Bharatkumar Hegde, Bloomfield Hills, MI (US); Ibrahim Haskara, Macomb, MI (US); Shailendra Kaushik, Novi, MI (US); Chen-Fang Chang, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 68 days.

(21) Appl. No.: 17/701,782

(22) Filed: Mar. 23, 2022

(65) Prior Publication Data
US 2023/0304816 A1    Sep. 28, 2023

(51) Int. Cl.
*G01C 21/00* (2006.01)
*B60W 40/08* (2012.01)
*G01C 21/34* (2006.01)

(52) U.S. Cl.
CPC ......... *G01C 21/3492* (2013.01); *B60W 40/08* (2013.01); *G01C 21/3461* (2013.01); *G01C 21/3484* (2013.01); *B60W 2040/0872* (2013.01)

(58) Field of Classification Search
None
See application file for complete search history.

(56) References Cited

U.S. PATENT DOCUMENTS

| | | | |
|---|---|---|---|
| 6,209,794 B1 * | 4/2001 | Webster | G06F 30/15 236/94 |
| 2002/0125332 A1 * | 9/2002 | Aoki | B60H 1/0075 236/49.3 |

(Continued)

FOREIGN PATENT DOCUMENTS

| DE | 10204191 A1 | 9/2002 |
|---|---|---|
| DE | 10326649 A1 | 12/2004 |

OTHER PUBLICATIONS

"Solar Heat Load on the Vehicle Occupants," by R. Kakade and P. Mer SAE International, published Apr. 5, 2016.

(Continued)

*Primary Examiner* — Tiffany P Young

(57) ABSTRACT

A solar loading-based system includes a memory, a disturbance prediction module, a cabin temperature estimation module and a thermal control module. The memory stores a cabin thermal load model of an interior cabin of a host vehicle and a solar load prediction model. The disturbance prediction module: receives signals indicative of states of cabin thermal actuators and comfort metrics; and predicts an effect of solar loading over a known portion of a predicted route including predicting cabin temperatures based on the solar load prediction model, the states of the cabin thermal actuators, and the comfort metrics. The cabin temperature estimation module, based on the cabin thermal load model, determines a first comfort metric based on the predicted cabin temperatures. The thermal control module controls cabin thermal actuators to adjust cabin states, including the first comfort metric, to respective target values based on the predicted effect of solar loading.

19 Claims, 14 Drawing Sheets

(56) References Cited

U.S. PATENT DOCUMENTS

| | | | |
|---|---|---|---|
| 2003/0066299 A1* | 4/2003 | Aoki | B60H 1/00864 |
| | | | 236/91 C |
| 2010/0019050 A1* | 1/2010 | Han | B60H 1/00642 |
| | | | 236/44 C |
| 2019/0265057 A1 | 8/2019 | Baglino et al. | |
| 2020/0361281 A1* | 11/2020 | Williams | B60H 1/00385 |
| 2021/0094394 A1* | 4/2021 | Costa | G07C 5/085 |

OTHER PUBLICATIONS

Office Action dated Jan. 10, 2024 from German Patent Office for German Patent No. 10 2022 127 383.0.

\* cited by examiner

SOLAR-LOAD PREDICTION FOR VEHICULAR CABIN THERMAL ACTUATOR CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicular cabin temperature control systems.

Vehicles may include internal combustion engines (ICEs) and/or electric motors for propulsion purposes. A traditional vehicle may include an ICE that consumes fuel for propulsion purposes as well as to power vehicles systems, such as a heating, ventilation, and air-condition (HVAC) systems. A hybrid electric vehicle includes both an ICE and a battery pack for powering vehicle systems. An electric vehicle powers vehicles systems using one or more battery packs. The battery pack(s) provide power to various vehicle systems including a propulsion system, lighting systems, infotainment systems, HVAC systems, braking systems, steering systems, autonomous control systems, navigation systems, etc.

SUMMARY

A solar loading-based system is disclosed and includes a memory, a disturbance prediction module, a cabin temperature estimation module and a thermal control module. The memory is configured to store a cabin thermal load model of an interior cabin of a host vehicle and a solar load prediction model. The disturbance prediction module is configured to: receive signals indicative of states of cabin thermal actuators and one or more comfort metrics; and predict an effect of solar loading over a known portion of a predicted route including predicting cabin temperatures based on the solar load prediction model, the states of the cabin thermal actuators, and the one or more comfort metrics. The cabin temperature estimation module is configured, based on the cabin thermal load model, to determine a first comfort metric of the one or more comfort metrics based on the predicted cabin temperatures. The thermal control module is configured to control cabin thermal actuators to adjust cabin states, including the first comfort metric, to respective target values based on the predicted effect of solar loading over the known portion of the predicted route.

In other features, the memory is configured to store a cabin disturbance prediction model. The cabin disturbance prediction model is configured to predict changes in cabin temperature dues to changes in control of the cabin thermal actuators based on outputs of sensors and states of the cabin thermal actuators.

In other features, the solar loading-based system further includes a summer. The cabin temperature estimation module is configured to determine comfort metrics including the one or more comfort metrics based on the predicted cabin temperatures. The summer is configured to determine error values between setpoints and the comfort metrics. The thermal control module is configured to control the cabin thermal actuators to reduce the error values.

In other features, the comfort metrics include two or more of (i) a temperature within the interior cabin, (ii) an equivalent homogeneous temperature, (iii) a mean radiant temperature, and (iv) a predicted mean vote.

In other features, the solar load prediction model predicts solar loading over a route of the host vehicle.

In other features, the disturbance prediction module is configured to determine at least one of the predicted cabin temperatures or the one or more comfort metrics based on changes in predicted solar loading provided by the solar load prediction model and states of a thermal system of the interior cabin.

In other features, the first comfort metric is a temperature within the interior cabin, an equivalent homogeneous temperature, a mean radiant temperature, or a predicted mean vote.

In other features, the solar loading-based system further includes a summer configured to determine a first error value between a first setpoint and the first comfort metric. The disturbance prediction module, the cabin temperature estimation module and the thermal control module implement both reactive and predictive control to minimize the first error value over a route traveled by the host vehicle.

In other features, the solar load prediction model predicts locations of a solar energy source relative to the host vehicle and along a route and, based on the predicted locations, predicts solar loading over the route of the host vehicle. The disturbance prediction module is configured to determine the predicted cabin temperatures based on changes in the predicted solar loading provided by the solar load prediction model.

In other features, the disturbance prediction module is configured to: based on weather conditions and the solar load prediction model, predict locations of a solar energy source relative to the host vehicle along a route; and based on the weather conditions, the solar load prediction model, the cabin thermal load model, and the predicted locations of the solar energy source, predict solar loading on at least one of a cabin thermal system of the host vehicle or one or more passengers of the host vehicle.

In other features, the thermal control module is configured to control the cabin thermal actuators based on one or more performance metrics and one or more constraints.

In other features, the disturbance prediction module is configured to predict solar loading from a current timestep and over a predetermined prediction horizon. The thermal control module is configured to: control the cabin thermal actuators to achieve a target control objective over the predetermined prediction horizon; project current control parameters used to achieve the target control objective over a predetermined control horizon; and introduce control gain to compensate for the solar loading at the current timestep.

In other features, a solar loading-based method is disclosed and includes: storing a cabin thermal load model of an interior cabin of a host vehicle and a solar load prediction model in a memory; receiving signals indicative of states of cabin thermal actuators and temperatures of the interior cabin; predicting cabin temperatures based on the solar load prediction model, the states of the cabin thermal actuators, and the temperatures of the interior cabin; based on the cabin thermal load model, determining a first comfort metric based on the predicted cabin temperatures; determining a first error value between a first setpoint and the first comfort metric; and controlling cabin thermal actuators to reduce the first error value.

In other features, the solar loading-based method further includes: storing a cabin disturbance prediction model in the memory; and predicting changes in cabin temperature via the cabin disturbance prediction model due to changes in control of the cabin thermal actuators based on outputs of sensors and states of the cabin thermal actuators.

In other features, the solar loading-based method further includes: determining comfort metrics based on the predicted cabin temperatures including the first comfort metric; determining error values between setpoints and the comfort metrics, where the error values include the first error value, where the setpoints including the first setpoint; and controlling the cabin thermal actuators to reduce the error values.

In other features, the solar loading-based method further including determining the predicted cabin temperatures based on changes in predicted solar loading provided by the solar load prediction model. The solar load prediction model predicts the solar loading over a route of the host vehicle.

In other features, the first comfort metric is a temperature within the interior cabin, an equivalent homogeneous temperature, a mean radiant temperature, or a predicted mean vote.

In other features, the solar loading-based method further includes implementing both reactive and predictive control to minimize the first error value over a route traveled by the host vehicle.

In other features, the solar loading-based method further includes: predicting locations of a solar energy source relative to the host vehicle and along a route and, based on the predicted locations, predicts solar loading over the route of the host vehicle; and determining the predicted cabin temperatures based on changes in the predicted solar loading provided by the solar load prediction model.

In other features, the solar loading-based method further includes: based on weather conditions and the solar load prediction model, predicting locations of a solar energy source relative to the host vehicle along a route; and based on weather conditions, the solar load prediction model, the cabin thermal load model, and the predicted locations of the solar energy source, predicting solar loading on at least one of a cabin thermal system of the host vehicle or one or more passengers of the host vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
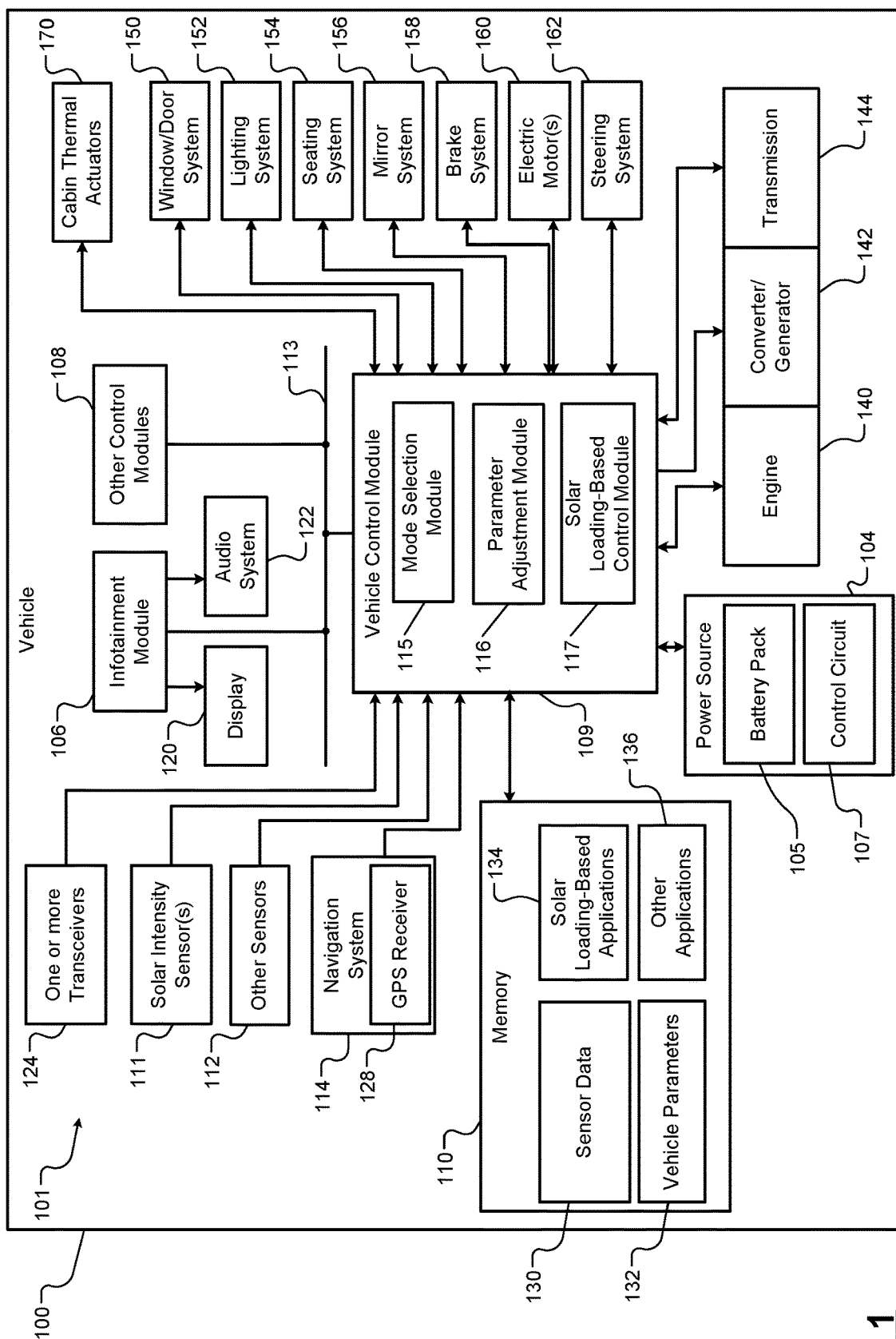
FIG. 1 is a functional block diagram of an example of a vehicle including a solar loading-based control module in accordance with the present disclosure.

One control strategy for controlling operation of a vehicle is to minimize energy consumption. This is true regardless of the one or more energy sources of the vehicle. Energy consumption can be affected by solar loading. Solar loading refers to an amount of thermal energy provided by a solar energy source (e.g., the sun) to an interior cabin (referred to hereinafter as "the cabin" or "a cabin") of a host vehicle. Solar loading may be measured in Watts (W) and be experienced differently for different zones of a cabin depending on the location and elevation of the solar energy source relative to the vehicle. Up to ~60% of interior HVAC system load can be associated with solar irradiation. The solar loading varies based on the time of day, the location of a vehicle, the location (longitudinal and latitudinal coordinates) of a vehicle relative to objects (e.g., buildings, trees, tunnels, etc.), the weather, the season, the date and time of day, etc. Solar load on a vehicle varies based on whether the solar energy source is located above the vehicle or facing a windshield, a side window or a read window of the vehicle. If facing the windshield of the vehicle, the solar loading is typically highest because the windshield has the largest surface area of the vehicle windows and has high transmissivity. Solar loading through a window can be reduced by tinting or shading the window. At nighttime, solar loading is zero.

Solar loading affects operation of an HVAC system of a vehicle. As an example, an HVAC system may be configured to maintain a set temperature within a cabin of the vehicle. Solar loading can heat up the cabin. In the summertime, the HVAC system may increase the level of cooling to compensate for the increase in temperature and maintain the cabin at the set temperature. The increase level of cooling results in an increased level of energy consumption. In the wintertime, the HVAC system may reduce an amount of heating due to the increase in cabin temperature. The reduced amount of heating results in a decreased level of energy consumption. This type of HVAC control is referred to as reactive HVAC control and does not account for solar loading and thus has limited ability to maintain a set temperature. Spikes in cabin temperature can occur prior to an HVAC system reacting and bringing the cabin temperature back down to the set temperature. Also, when solar loading decreases drastically and/or is suddenly stopped, the HVAC system can be slow to react in reducing the previously provided higher level of cooling.

The longer a trip (or route) a vehicle is traveling, the more solar loading can significantly affect energy consumption. This is dependent on environmental conditions, time of day, locations of the solar energy source relative to the vehicle, etc. As an example, a vehicle may have multiple candidate routes available to follow from an origin to a destination. One of the candidate routes may have significantly less solar loading than another candidate route. This difference may be significant enough to warrant selecting the candidate route based on solar loading. This is further described below.

Examples set forth herein include solar loading-based systems. The systems determine current solar loading and predict future solar loading on a vehicle for candidate routes and control cabin thermal actuators based on the determined and predicted solar loading. The systems also perform range estimation and eco-routing based on the solar loading. The term "eco-routing" refers to the selection of a route for a vehicle to travel based on energy consumption.

FIG. 1 shows a vehicle 100 including a solar loading-based system 101. The vehicle 100 may be a non-autonomous, partially autonomous or fully autonomous vehicle. The vehicle 100 may be non-electric, hybrid or fully electric vehicle. The vehicle 100 includes a solar loading-based system 101 including the vehicle control module 109, a memory 110, sensors 111, 112, actuators (examples of which are referred to below) and a navigation system 114. The vehicle 100 may include a power source 104, an infotainment module 106 and other control modules 108. The power source 104 includes one or more battery packs (one battery pack 105 is shown) and a control circuit 107. The modules 106, 108, 109 may communicate with each other and have access to the memory 110 via one or more buses and/or network interfaces 113.

The vehicle control module 109 controls operation of vehicle systems. The vehicle control module 109 may include a mode selection module 115, a parameter adjustment module 116, a solar loading-based control module 117 as well as other modules. The mode selection module 115 may select a vehicle operating mode. The parameter adjustment module 116 may be used to adjust parameters of the vehicle 100. The solar loading-based control module 117 performs cabin thermal control operations, range extension operations and eco-routing operations based on solar loading as further described below.

The solar intensity sensors 111 may include solar radiation detecting sensors for detecting intensity and/or amount of solar radiation at one or more locations on and/or in the vehicle. One or more solar intensity sensors 111 may be included and may indicate the current location and timestamp of detected solar intensity and/or radiation levels. The sensors 112 may include cameras, objection detection sensors, temperature sensors, accelerometers, a vehicle velocity sensor, and/or other sensors.

The vehicle 100 may further include a display 120, an audio system 122, and one or more transceivers 124. The display 120 and/or audio system 122 may be used to indicate to a vehicle operator (or user) candidate routes for the vehicle and solar loading related information, such as amounts of solar loading for the candidate routes and/or amounts of energy consumption due to solar loading for the candidate routes. In one embodiment, the routes and corresponding amounts of total energy consumption including energy consumption due to solar loading are displayed for the user to select one of the routes. The display may also be used to display range estimations for each of the candidate routes. Range estimation may refer to, for example, how many miles the vehicle 100 is able to travel for each selected route, how much energy (or fuel) will be remaining after following each route, whether the vehicle is able to make it to the destination if a route is followed, etc.

The navigation system 114 includes a global positioning system (GPS) receiver 128. The GPS receiver 128 may provide vehicle velocity and/or direction (or heading) of the vehicle and/or global clock timing information. The GPS receiver may also provide vehicle location information and map information. The map information may include candidate routes to travel between a starting location (or origin) and a destination. The candidate routes may be provided based on distance, traffic levels, etc. The solar loading-based control module may then determine solar loading for each of the candidate routes, perform range estimation for each of the candidate routes and either select one of the routes based on solar loading and/or inform the user of the candidate routes and corresponding route information to make an informed selection.

The memory 110 may store sensor data 130, vehicle parameters 132, solar loading-based applications 134 and other applications 136. The solar loading-based applications may be implemented by the solar loading-based control module 117. The applications 136 may include applications executed by the modules 106, 108, 109. Although the memory 110 and the vehicle control module 109 are shown as separate devices, the memory 110 and the vehicle control module 109 may be implemented as a single device.

The vehicle control module 109 may control operation of an engine 140, a converter/generator 142, a transmission 144, a window/door system 150, a lighting system 152, a seating system 154, a mirror system 156, a brake system 158, electric motors 160 and/or a steering system 162 according to parameters set by the modules 106, 108, 109, 117. The vehicle control module 109 may set some of the parameters based on signals received from the sensors 111, 112. The vehicle control module 109 may receive power from the power source 104, which may be provided to the engine 140, the converter/generator 142, the transmission 144, the window/door system 150, the lighting system 152, the seating system 154, the mirror system 156, the brake system 158, the electric motors 160 and/or the steering system 162, etc. Some of the vehicle control operations may include unlocking doors of the window/door system 150, enabling fuel and spark of the engine 140, starting the electric motors 160, powering any of the systems 150, 152, 154, 156, 158, 162, and/or performing other operations as are further described herein.

The engine 140, the converter/generator 142, the transmission 144, the window/door system 150, the lighting system 152, the seating system 154, the mirror system 156, the brake system 158, the electric motors 160 and/or the steering system 162 may include actuators controlled by the vehicle control module 109 to, for example, adjust fuel, spark, air flow, steering wheel angle, throttle position, pedal position, door locks, window position, seat angles, etc. This control may be based on the outputs of the sensors 111, 112, the navigation system 114, the GPS receiver 128 and the above-stated data and information stored in the memory 110.

The vehicle control module 109 may determine various parameters including a vehicle speed, an engine speed, an engine torque, a gear state, an accelerometer position, a brake pedal position, an amount of regenerative (charge) power, an amount of boost (discharge) power, an amount of auto start/stop discharge power, and/or other information. The vehicle control module 109 may share this information and the vehicle operating mode with the control circuit 107. The control circuit 107 may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values cells, blocks, packs, and/or groups; temperatures of cells, blocks, packs, and/or groups; current values of cells, blocks, packs, and/or groups; power values cells, blocks, packs, and/or groups; etc. The control circuit 107 may determine connected configurations of the cells and corresponding switch states based on the parameters determined by the vehicle control module 109 and/or the control circuit 107. In one embodiment, the vehicle control module 109 and the control circuit 107 are implemented as a single control module.

Figure 2:
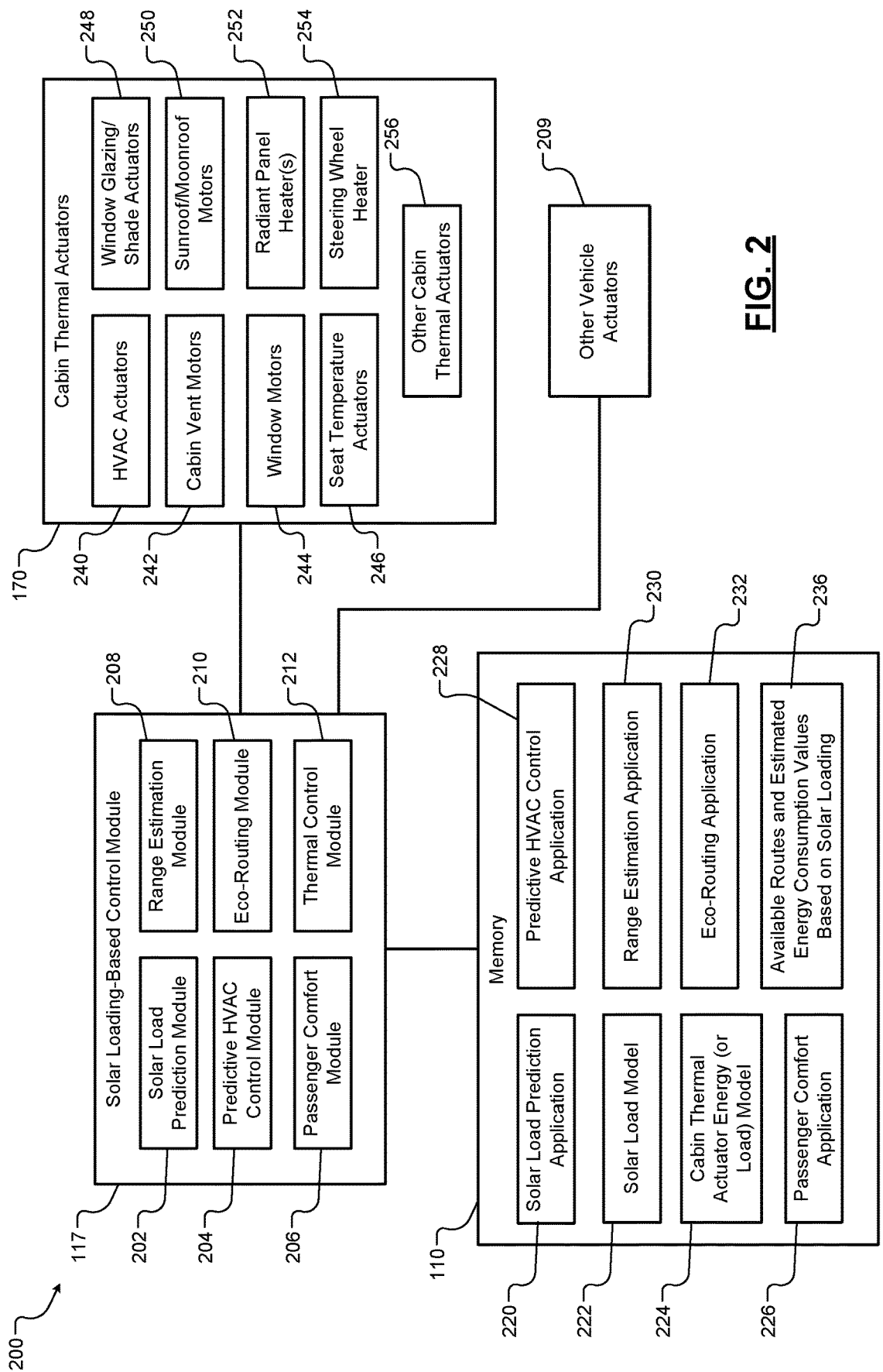
FIG. 2 is a functional block diagram of an example of a solar loading-based control system in accordance with the present disclosure.

The solar loading-based control module 117 may control cabin thermal actuators 170 based on solar loading. Examples of the cabin thermal actuators are shown in FIG. 2. The solar loading-based control module 117 may receive information from the control circuit 107 and/or the sensors 112, such as SOC of the battery pack 105, amount of remaining fuel via a fuel level sensor, etc. The solar loading-based control module 117 may then be able to, based on this information and estimated amount of energy consumption, provide range estimation information.

FIG. 2 shows an example of a solar loading-based control system 200 including the solar loading-based control module 117, the memory 110 and the cabin thermal actuators 170. The solar loading-based control module 117 may include a solar load prediction module 202, a predictive HVAC control module 204, a passenger comfort module 206, a range estimation module 208, an eco-routing module 210, and a thermal control module 212. The memory 110 may store a solar load prediction application 220, a solar load model 222, a cabin thermal actuator (or load) model 224, a passenger comfort application 226, a predictive HVAC control application 228, a range estimation application 230, an eco-routing application 232 and other information 236 including available routes and estimated energy consumption values based solar loading.

The solar load prediction module 202 may execute the solar load prediction application 220 and determine solar loading and effects of solar loading on cabin temperatures. This may be based on the solar load model 222 and the cabin thermal actuator energy model 224. Methods of determining solar loading are described below and may be implemented by the solar load prediction module 202. The predictive HVAC control module 204 may execute the predictive HVAC control application 228 to control the cabin thermal actuators 170. This control may be based on solar loading as described below.

The solar loading-based control module 117 may operate as a trip energy prediction device for estimating the amount of energy for a vehicle to travel from a first location (or origin) to a second location (or destination). This may be based on the solar load predictions, predictive HVAC consumption, and/or other energy consumption values. As an example, the solar loading-based control module 117 may include a driver model that is used for navigation and charge planning of all drivers. The trip energy prediction values may be the same or different for all drivers and be based on different driving styles and changing traffic conditions. The solar loading-based control module 117 may indicate whether the vehicle has enough remaining energy to make a non-stop trip and whether the vehicle will need to be charged along the route prior to reaching the destination.

The solar loading-based control module 117 may implement categorical driver models, personalized (or driver specific) driver models, and energy estimation algorithms for accurately estimating total trip energy. The total trip energy may be based on a baseline driver model, a dynamic driving model, a cabin thermal energy model, a solar loading model and/or other models and solar loading predictions as disclosed herein. The baseline driving model captures energy for a driver of a vehicle traveling at an average speed and exhibiting an average amount of acceleration throughout the trip. The dynamic driving model captures differences between (i) energy usage associated with the baseline driving model, and (ii) energy usage associated with estimated and/or predicted driving of the driver. The differences are due to different driving styles and behaviors of the driver relative to an average driver and on-road traffic conditions, which may vary relative to predicted traffic conditions.

The solar loading-based control module 117 may implement a recursive algorithm that learns individual driver accelerating, decelerating and speeding style. A dynamic driving model is provided as a function of learned driving style and traffic information. The dynamic driving model is used to predict energy usage differences of individual drivers for a given route, which allows for improved prediction of when a host vehicle will need to be charged and/or whether a non-stop trip, without charging along the route, is possible. The energy usage for an individual driver may refer to energy usage: when the individual driver is driving the vehicle directly and the vehicle is not being operated in a semi-autonomous or fully autonomous driving mode; when the individual driver is driving the vehicle in a semi-autonomous driving mode; and/or when the individual is in the driver seat and the vehicle is being driven in a fully autonomous driving mode.

The passenger comfort module 206 may execute the passenger comfort application 226 to determine passenger comfort levels based on solar loading as further described below. The range estimation module 208 may execute the range estimation application 230 to provide range estimates for candidate routes as described herein.

The eco-routing module 210 may execute the eco-routing application 232 to select a route to follow and/or to provide route information to a user for an informed selection of a route as described herein. The route may be selected based on solar loading predictions for candidate routes, energy consumption for the candidate routes, and/or estimated ranges of the host vehicle if the candidate routes are followed. The estimated ranges may be predicted by the range estimation module 208. The thermal control module 212 may provide open loop and/or closed control of cabin temperatures. The thermal control module 212 may include the predictive HVAC control module 204.

The cabin thermal actuators 170 may include HVAC actuators 240, cabin vent motors 242, window motors 244, seat temperature actuators 246, window glazing and shade actuators 248, sunroof or moonroof motors 250, radiant panel heaters 252, a steering wheel heater 254, and other cabin thermal actuators 256. The HVAC actuators may include a compressor motor, a condenser fan motor, an expansion valve, an evaporator fan motor, etc. The window motors 244 may be part of the window/door system 150. The window glazing and shade actuators 248 control window transmissivity levels, tint levels, shading levels, etc. The window glazing and shade actuators may include shade motors, tinting electronics, windows with active layers that change transmissivity based on current applied, etc. The other vehicle actuators 209 may include other vehicle motors, valves, etc.

Figure 3:
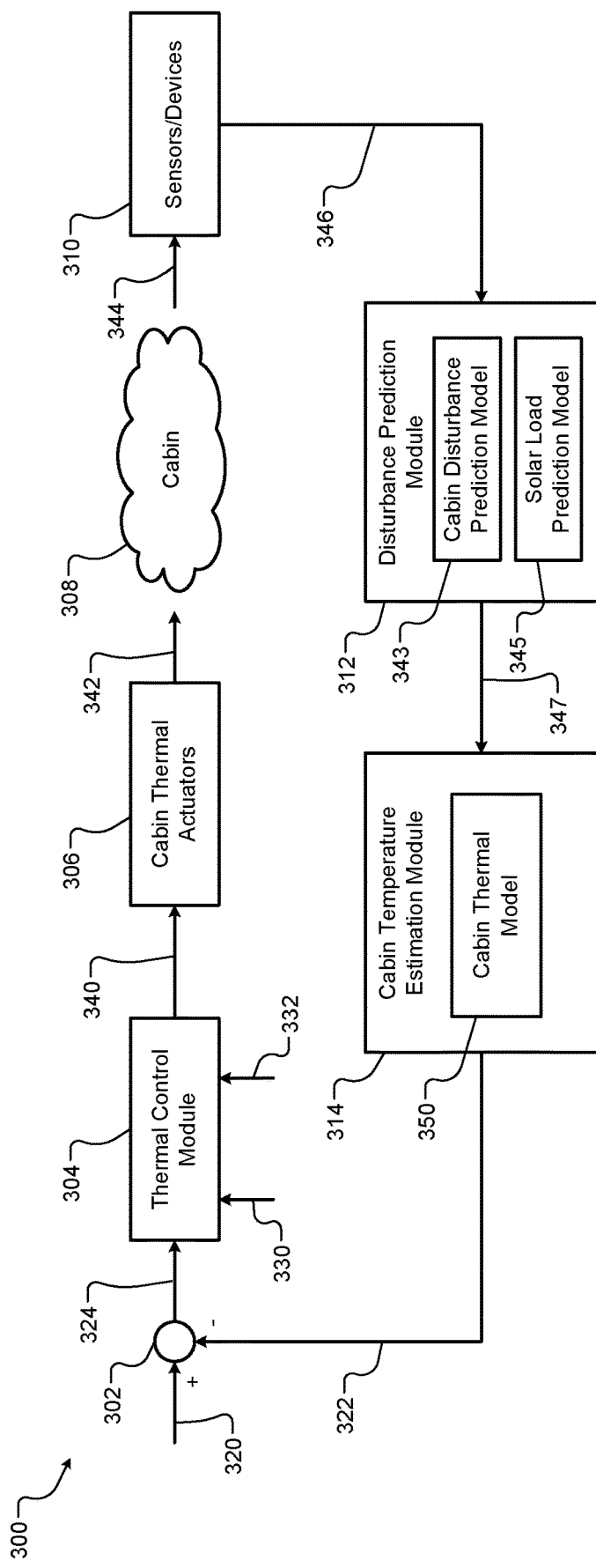
FIG. 3 is a functional block diagram of a closed feedback control system operating based on solar loading in accordance with the present disclosure.

FIG. 3 shows a closed feedback control system 300 operating based on solar loading. The closed feedback control system 300 includes: a summer 302; the thermal control module 304; cabin thermal actuators 306, which are controlled to set temperatures of a cabin 308; sensors and/or devices 310; a disturbance prediction module 312, and a cabin temperature estimation module 314.

The summer 302 receives a setpoint (e.g., a target cabin air temperature or other target comfort metric) 320 and a current cabin air temperature 322. The summer 302 subtracts the current cabin air temperature 322 from the setpoint 320 to provide an error 324. The target comfort metric may be an equivalent homogenous temperature (EHT), a predicted mean vote (PMV), a mean radiant temperature (MRT), or other comfort metric for quantifying a comfort level of a user and/or passenger. The PMV metric refers to how a passenger feels under different conditions of a cabin (e.g., slightly cooler or slightly warmer). The PMV metric may be a scale between −5.0 and 5.0, where −5.0 is very cold, 0 is comfortable, and 5.0 is very warm.

The thermal control module 304 generates control signals to control the cabin thermal actuators 306 based on the error 324, performance metrics 330 and constraints 332. The cabin thermal actuators 306 may include any of the cabin thermal actuators 170 of FIG. 2. The performance metrics 330 include, for example: an amount of energy used to maintain a particular temperature; minimize the amount of error 324 (or an amount of deviation from the setpoint 320); maintain the error below a predetermined level; etc. The constraints 332 include, for example: prevent deviation from the setpoint 320 of more than 5%; preventing use of more power than a condenser of the HVAC system can provide at a given moment in time; limiting an air flow to be within a predetermined range; limiting ON time, duty cycle, frequency, current levels, voltage levels, and/or power levels of one or more cabin thermal actuators 306 to be within predetermined ranges; etc.

The thermal control module 304 generates the control signals 340 to adjust cabin temperatures and/or devices therein for occupant comfort. The control signals 340 may be generated to compensate for solar loading. The control signals 340 are provided to the cabin thermal actuators 306. The cabin thermal actuators 306, which are controlled to set temperatures of a cabin 308. The thermal control module 304 may try different HVAC control actuations to determine what happens to the error 324 and then pick a best actuation control including setting parameters of the cabin thermal actuators 306. This is represented by arrow 342. The thermal control module 304 is configured to alter states of the cabin thermal actuators including altering: a discharge vent temperature; a condenser status; an air flow rate; an ambient air mixing ratio; glazing, tinting and/or shading statuses of windows; a sunroof status; a radiant panel status; seat warmer statuses; a steering wheel heater status; etc.

The disturbance prediction module 312 may include a cabin disturbance prediction model 343 and a solar load prediction model 345. The models may receive various information, such as location and elevation of a solar energy source (e.g., the sun) relative to the vehicle, time of day, weather condition information (e.g., rainy, cloudy, snowing, sunny, temperatures, etc.), route information, vehicle heading, ambient temperature, cabin temperature, etc. from the sensors and/or devices 310 and/or other devices referred to herein. The detected information is represented by arrow 344. The sensors and/or devices 310 may include the sensors shown in FIG. 1 and indicate states of an HVAC system, states of cabin thermal actuators, temperatures of zones within a cabin, etc. The outputs and/or states of the sensors and/or devices 310 is represented by arrow 346. The devices may refer to devices of the cabin thermal actuators 306 and/or HVAC system.

The solar load prediction model 345 is configured to, based on the received information from the sensors and/or devices 310 and/or states of the cabin thermal actuators 306, determine current solar loading levels and/or predict future solar loading levels for a route. The disturbance prediction model 343 is configured to, based on the received information, determine current temperatures of zones within the cabin and predict future changes in the temperatures over a route. This may be based on sizes, shapes, volumes, shading, and locations within the cabin of the zones. The cabin disturbance prediction model 343 determines the predicted cabin temperatures based on changes in the predicted solar loading provided by the solar load prediction model and/or based on the outputs of the sensors 310 and/or states of the cabin thermal actuators 306. The disturbance prediction module 312 may output current and predicted cabin temperatures 347 based on outputs of the models 343, 345.

The cabin temperature estimation module 314 may include a cabin thermal model 350 that relates outputs of the disturbance prediction module 312 to current cabin air temperatures or other comfort metrics. The cabin thermal model 350 may be implemented as a cabin thermal actuator energy (or load) model, as described above and referred to herein. The solar load on the vehicle may be the effect of solar radiation on passenger comfort metrics, effect of solar radiation on cabin air temperature, etc. The cabin thermal model 350 may be a mass-based model of the cabin and convert received current and predicted cabin temperatures from the disturbance prediction module 312 to one or more comfort metrics.

The control provided by the closed feedback control system 300 may include feedback control as shown and/or feedforward control and/or compensation. The closed feedback control system 300 may include model-predictive control, adaptive control and/or rule-based control.

Figure 4:
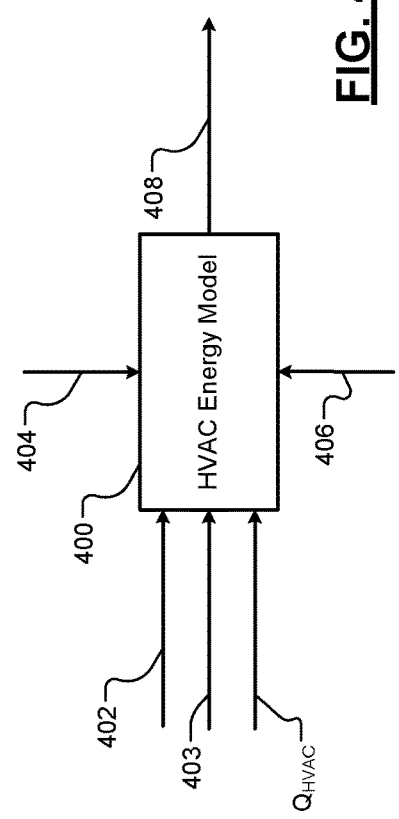
FIG. 4 is a functional block diagram of an example of a cabin thermal actuator energy model in accordance with the present disclosure.

FIG. 4 shows an example of a cabin thermal actuator energy model 400 (may be referred to as a "HVAC energy model") that may receive cabin temperatures 402, ambient temperatures 403, solar load $Q_{solar}$, a route 404, and vehicle cabin thermal parameters 406 and output an amount of HVAC and/or cabin thermal actuator energy consumed 408. In an embodiment, the cabin thermal actuator energy consumed 408 is equal to the amount of HVAC energy consumed, represented as $E_{HVAC}$. A simplified example of the cabin thermal actuator energy model 400 is described below, where the cabin thermal actuator energy model 400 is implemented as an HVAC energy model and is represented by equations 1-5.

A product of cabin thermal capacity C and a time derivative of cabin temperature $\dot{T}_c$ is represented by equation 1, where k is a heat transfer coefficient, $T_a$ is ambient temperature, $T_c$ is cabin temperature, $Q_{HVAC}$ is heat input to cabin from HVAC, and $Q_{solar}$ is solar load, which is dependent on solar energy source position relative to vehicle. Solar load sensors provide a current value of solar load, but do not provide predictive solar load for moments in time in the future. Predictive solar loading is provided, however, by implementing below disclosed methods.

$$C*\dot{T}_c = k*(T_a - T_c) + Q_{HVAC} + Q_{solar} \quad (1)$$

Instantaneous HVAC power consumed PHVAC may be represented by equation 2, where η is an efficiency value for converting electrical energy (or power) into heat. The efficiency parameter η may be represented as an available efficiency table of heat input to power conversion during HVAC control.

$$P_{HVAC} = \eta * Q_{HVAC} \quad (2)$$

Heat input to the cabin $Q_{HVAC}$ may be represented by equation 3, where G is control gain and $T_s$ is a setpoint (e.g., one of the comfort metrics and/or temperature setpoints). Equation 3 is a simple example HVAC control representation to achieve thermal balance to maintain cabin temperature at the setpoint.

$$Q_{HVAC} = k*(T_c - T_a) - Q_{solar} - G*(T_c - T_s) \quad (3)$$

Instantaneous HVAC power $P_{HVAC}$ may be represented by equation 4. Energy consumed by the HVAC system $E_{HVAC}$ may be represented by equation 5.

$$P_{HVAC} = \eta*(k*(T_c - T_a) - Q_{solar} - G*(T_c - T_s)) \quad (4)$$

$$E_{HVAC} = \int_t^{t+T_{ph}} \eta*(k*(T_c - T_a) - Q_{solar} - G*(T_c - T_s)) \quad (5)$$

Figure 5:
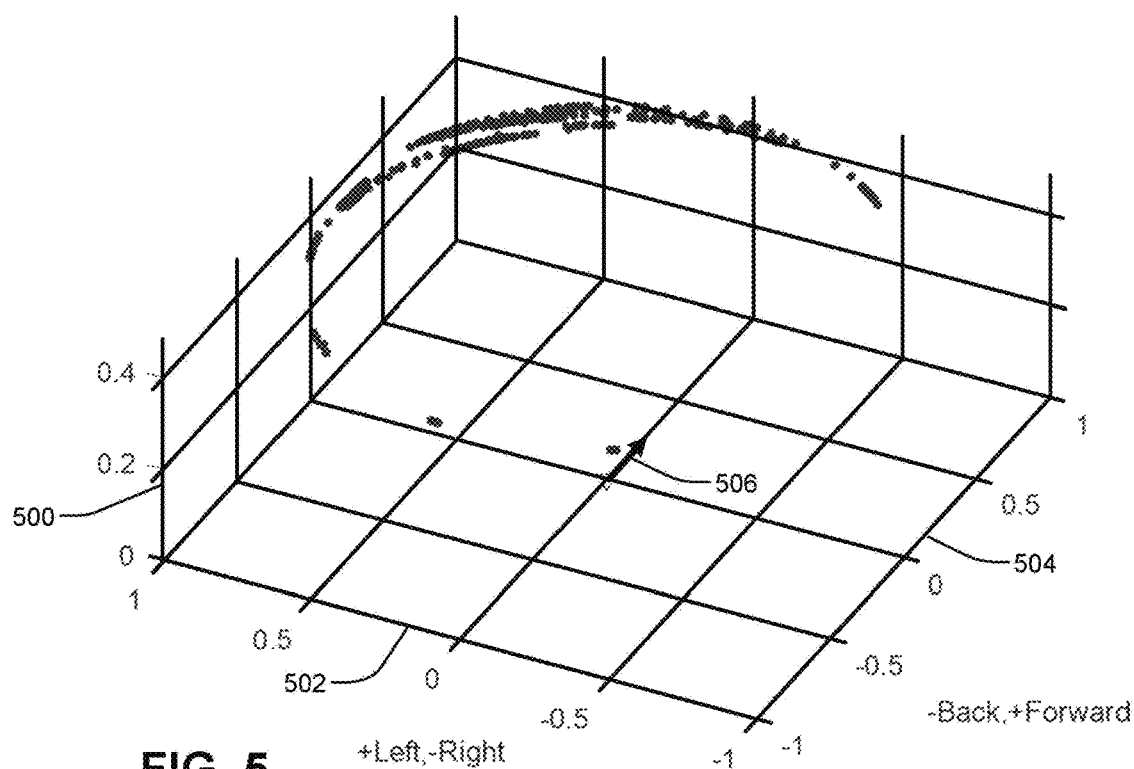
FIG. 5 is an example three-dimensional plot of solar energy source location relative to a vehicle over a route.
Figure 6:
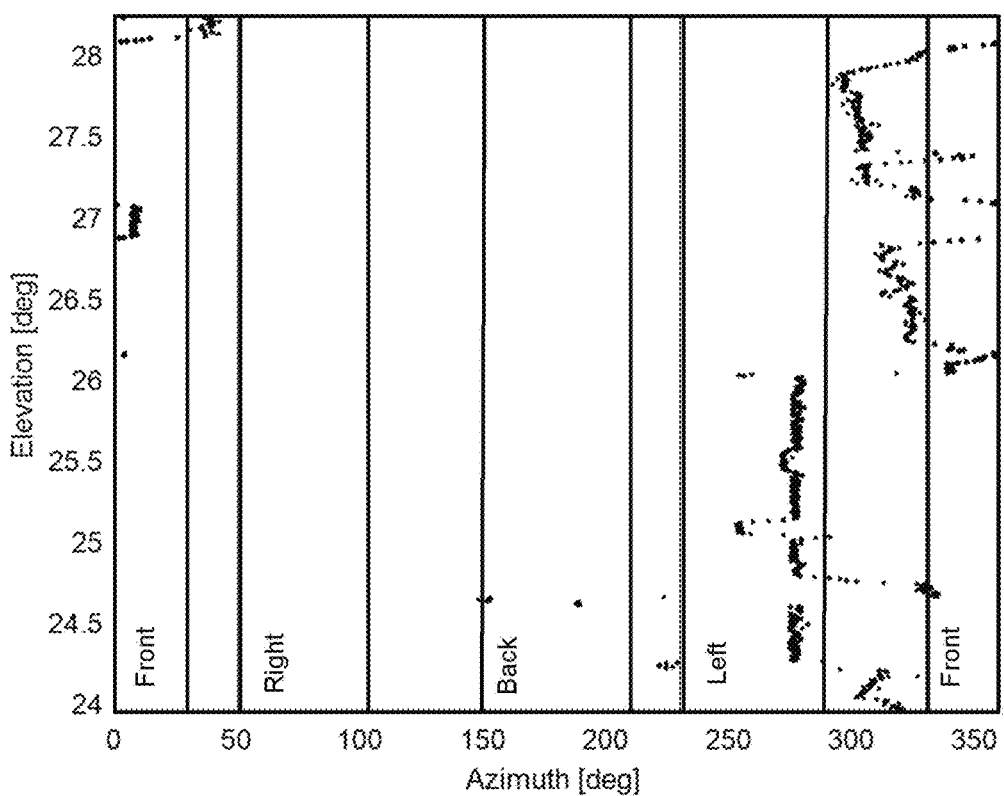
FIG. 6 shows an example two-dimensional plot of the solar energy source locations of FIG. 5 relative to sides of the vehicle.

FIG. 5 shows an example three-dimensional plot of solar energy source location relative to a vehicle over a route. The plot is an illustrative example of different solar energy source locations relative to the left and right sides of the vehicle and relative to the front and back of the vehicle. The three axes 500, 502, 504 of the plot are elevation, left/right position, and front/rear position of the solar energy source relative to the vehicle. Arrow 506 represents the heading of the vehicle. FIG. 6 shows an example two-dimensional plot of the solar energy source locations of FIG. 5 relative to sides of the vehicle. The solar energy source locations are represented by points on the plots. The locations of the solar energy source changes relative to the vehicle depending on the heading of the vehicle.

Figure 7:
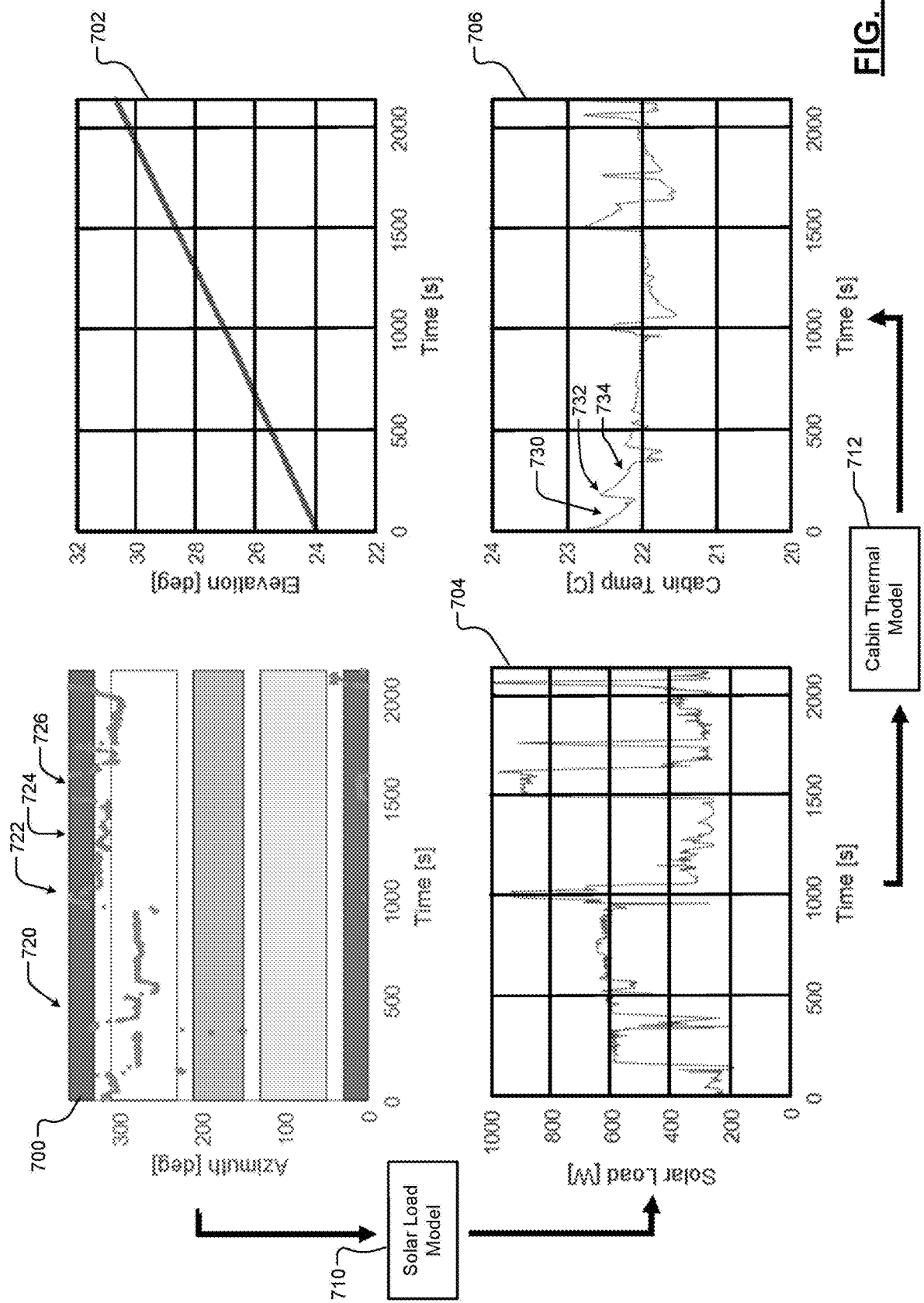
FIG. 7 includes example plots of solar energy source locations with respect to a vehicle, solar loading and energy consumption.

FIG. 7 shows example plots 700, 702, 704, 706 of solar energy source locations with respect to host vehicle, solar loading and energy consumption. The plot 700 is a plot of azimuth angle (or location in degrees) of solar energy source relative to the vehicle over time. The plot 702 is a plot of elevation in degrees of the solar energy source relative to the vehicle over time. The plot 704 is a plot of solar load in watts over time. The plot 706 is a plot of cabin temperature over time.

A solar load model 710, such as one of the solar load models disclosed herein, may convert the plot of azimuth angle 700 to the solar load plot 704. Various solar load models may be used to determine solar load. A cabin thermal model 712, such as one of the cabin thermal models disclosed herein, may convert the solar load plot 704 to the cabin temperature plot 706. Various cabin thermal models may be used to determine cabin temperature and are based on the application, the size, shape, volume, surrounding materials, size of windows, etc. Each of the cabin temperatures relates to HVAC energy consumption.

The plot 700 includes a first period 720 where the solar energy source is on a left side of the vehicle, a second period 722 where the solar energy source is in front of the vehicle, a third period 724 where the solar energy source is directed at an A-pillar of the vehicle, and a fourth period 726 where the solar energy source is in front of the vehicle again. The plot 706 includes a first period 730 where the HVAC system is cooling the cabin, then the solar loading changes and there is a spike in temperature at 732. The HVAC system increases cooling and the cabin temperature decreases during another period 734. The cabin temperatures shown may be predicted based on the known route, predicted solar energy source location relative to the vehicle and the models 710, 712. The plot 706 is an illustrate example effect of solar loading on the cabin.

Figure 8:
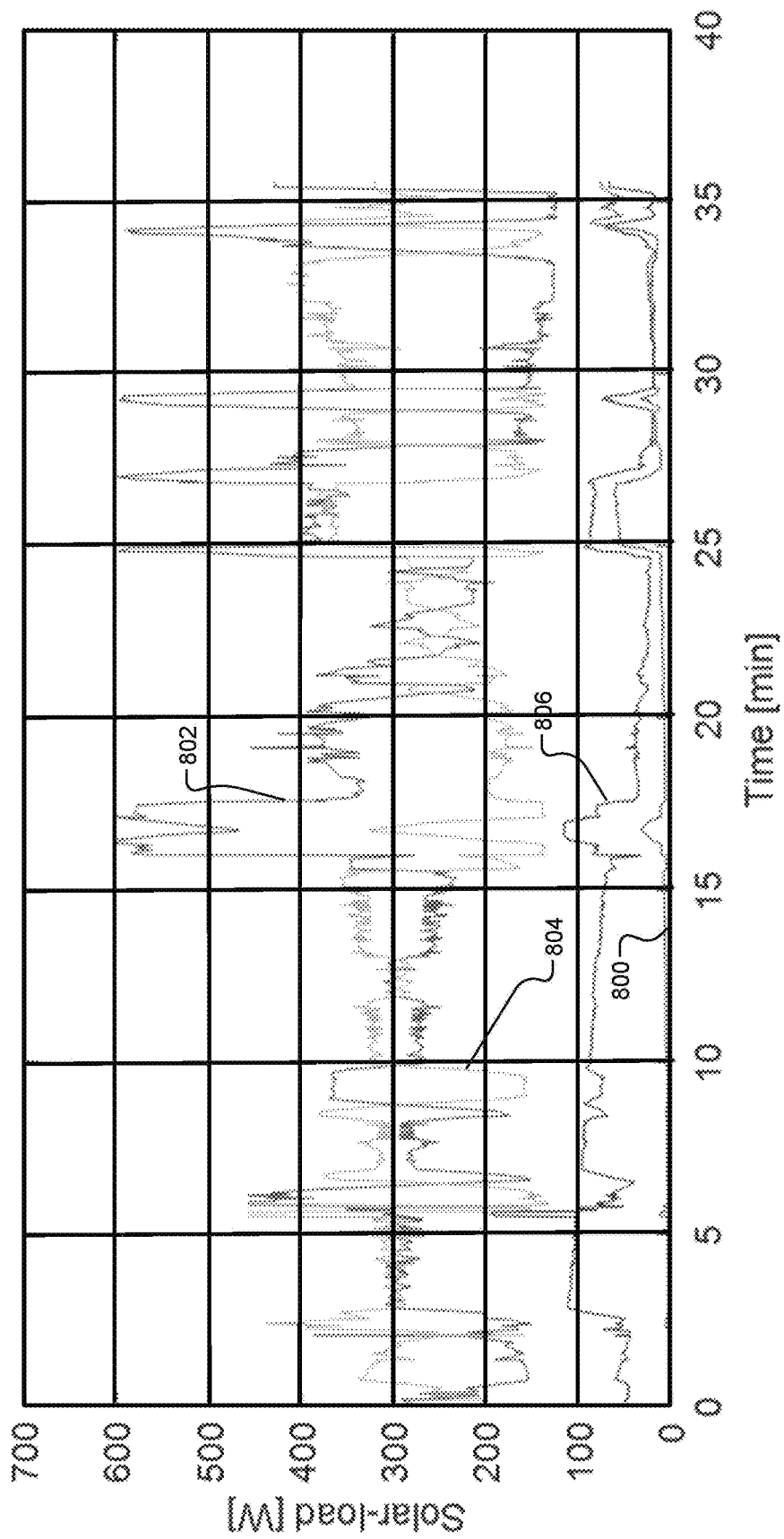
FIG. 8 is an example plot of solar loading on a vehicle for different times of a day.

FIG. 8 shows an example plot of solar loading on a vehicle for different times of a day. The plot includes solar loading curves 800, 802, 804, 806 for four different times of day. In the example shown, the times of day are 5:00 AM, 8:00 AM, 3:00 PM and 5:00 PM. The solar loading curves 800, 802, 804, 806 may be predicted based on the time of day and the route traveled. The solar loading through a window may be represented in watts per meter squared (or $W/m^2$) and is based on the transmissivity and size of the window.

Table 1 shows an example of solar load estimates in kilojoules (kJ) and contributions to range estimates in percentages for different times of day. These values may be, for example, a sunroof. As shown, the solar load estimate values increase from early morning to late morning, remain at a similar level during the day and then decrease towards evening. Similarly, the associated contribution of solar loading to power consumption and thus range estimates increase from early morning to late morning, remain at a similar level during the day and then decreases towards evening. The contribution values are directly related to the solar loading estimate values. Estimating and accounting for solar loading improves range estimation.

TABLE 1

Solar loads and contributions to range estimate for different times of day.

| Time | Solar Load Estimate (kJ) | Contribution to Range Estimate (%) |
| --- | --- | --- |
| 5:00 AM | 29.2 | 0.1 |
| 8:00 AM | 624.0 | 2.4 |
| 1:00 PM | 600.0 | 2.3 |
| 5:00 PM | 123.7 | 0.5 |

Table 2 shows an example of solar loading prediction for eco-routing. Table 2 includes solar loading estimates in kilojoules per minute (or kJ/min) and HVAC energy consumption values for two different seasons (winter (e.g., 0° C.) and summer (e.g., 25° C.)). The values are provided for three different possible routes to take between locations A (origin) and B (destination). The solar loading is less for the second route than the first route. The solar loading is less for the third route than the second route.

If the routes were the same length and took the same amount of time to travel, then the HVAC energy consumption values during the winter would increase from route 1 to route 3 because of increased heating. Similarly, if the routes were the same length and took the same amount of time to travel, then the HVAC energy consumption values during the summer would decrease due to a reduced amount of air conditioning. However, in this example, the routes are not the same length and do not take the same amount of time. In the winter, route 1 may be the best route, whereas in the summer, route 2 may be the best route. This is based on which route has the least amount of HVAC energy consumption. Solar loading-based energy consumption values may indicate a same or different route be selected then if the energy consumption values were not based on solar loading.

TABLE 2

Solar loads and HVAC energy consumptions for routes 1-3.

| Time | Solar Load (kJ/min) | HVAC Energy Consumption (kJ) - Winter | HVAC Energy Consumption (kJ) - Summer |
|---|---|---|---|
| Route 1 | 17.8 (+10.5%) | 777.4 (0.0%) | 703.5 (+2.1%) |
| Route 2 | 16.3 (+1.2%) | 849.8 (+9.3%) | 689.1 (0.0%) |
| Route 3 | 16.10 (0.0%) | 946.4 (+21.7%) | 781.3 (+13.3%) |

Figure 9:
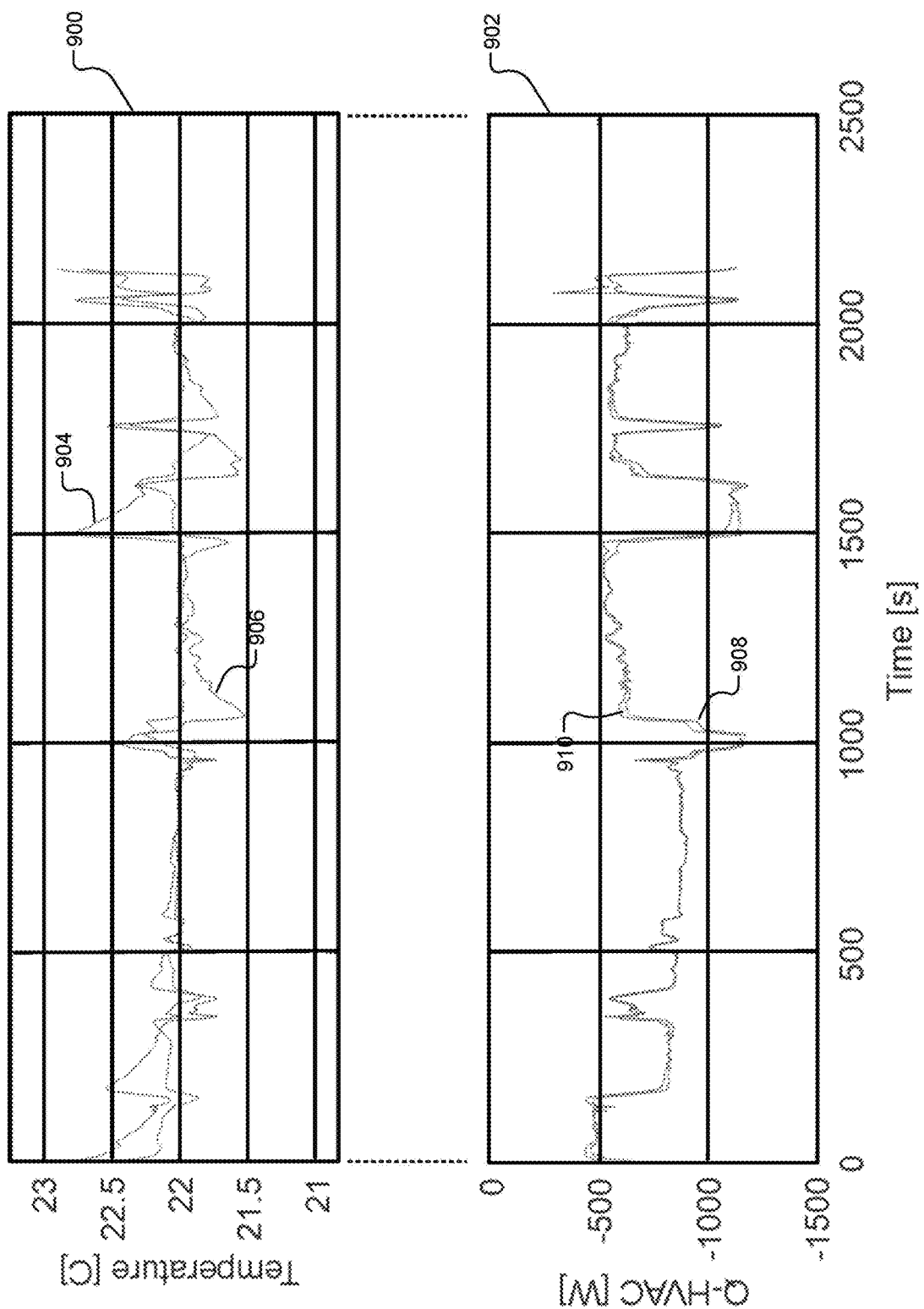
FIG. 9 includes example plots of cabin temperature and HVAC energy consumption versus time using proportional integral (PI) control versus using predictive control in accordance with the present disclosure.

FIG. 9 shows example plots of cabin temperature and HVAC energy consumption versus time using proportional integral (PI) control versus using predictive control. FIG. 9 includes two plots 900, 902, where the plot 900 includes a PI temperature control curve 904, a predictive temperature control curve 906, and where the plot 902 includes a PI cabin heat input (or power consumption) control curve 908 and a predictive cabin heat input (or power consumption) control curve 910.

As can be seen by the first plot 900, when predictive control is implemented, the variation in cabin temperature is less than when not implemented. Predictive control allows for the thermal control system to adjust actuator operations ahead of time to compensate for an upcoming change in solar loading. For example, if it is known that solar loading is to decrease and it is during the winter, then heating may be increased prior to the change in solar loading to slightly increase the cabin temperature to compensate for the upcoming decrease in solar loading (and thus heating due to solar loading).

As can be seen from the second plot 902, there is minimal difference in energy consumption due to solar loading prediction control. The solar loading prediction control may essentially shift when energy is consumed in time relative to PI control. In other words, a total same amount of energy may be consumed, but better cabin comfort performance is provided using the predictive control. Energy consumption savings may be associated with controlling thermal control actuators, such as radiant panels, widow glazing, shades, and selective zonal HVAC control.

Table 3 shows an example of differences in HVAC energy consumption and root mean square error (RMSE) cabin temperature values for when (i) no solar load estimates are generated (referred to as PI control), (ii) predictive control is performed including generating solar load estimates to minimize setpoint error, and (iii) predictive control is performed including generating solar load estimates to minimize energy consumption. Predictive control may be performed based on other metrics, such as EHT, PMV, and MRT, which may increase the benefits of predictive control.

TABLE 3

HVAC Energy Consumption and RMSE Cabin Temperature Values.

| Parameter | No Solar load Estimates (PI Control) | Predictive Control with Solar Load Estimates to Minimize Setpoint Error | Predictive Control with Solar Load Estimates to Minimize Energy Consumption |
|---|---|---|---|
| HVAC Energy Consumption (kJ) | 1127.5 | 1127.4 | 1123.2 (−0.4%) |
| RMSE Cabin Temperature (° C.) | 0.15 | 0.06 (−54%) | 0.15 |

The operations of the following methods of FIGS. 10-16 may be iteratively performed. Although the following methods are shown as separate methods, one or more of the methods and/or operations from separate methods may be combined and performed as a single method. Although the following operations are primarily described with respect to the implementations of FIGS. 1-4, the operations may be easily modified to apply to other implementations of the present disclosure.

Figure 10:
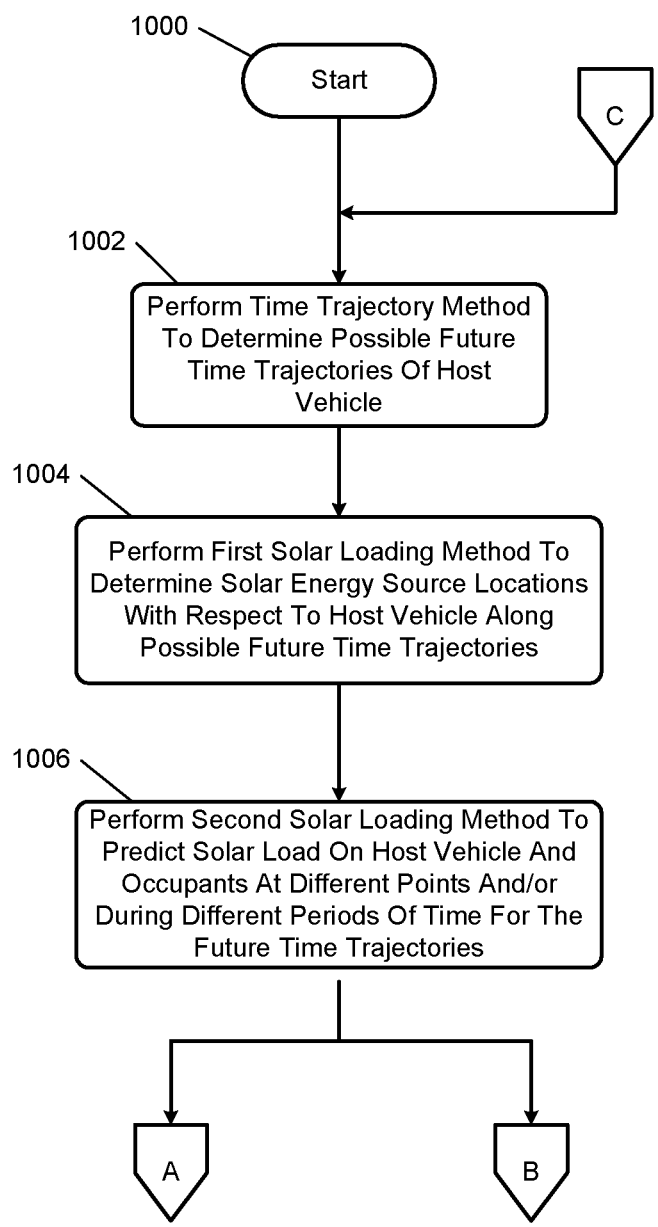
FIG. 10 illustrates an overview of a solar load based method in accordance with the present disclosure.
Figure 11:
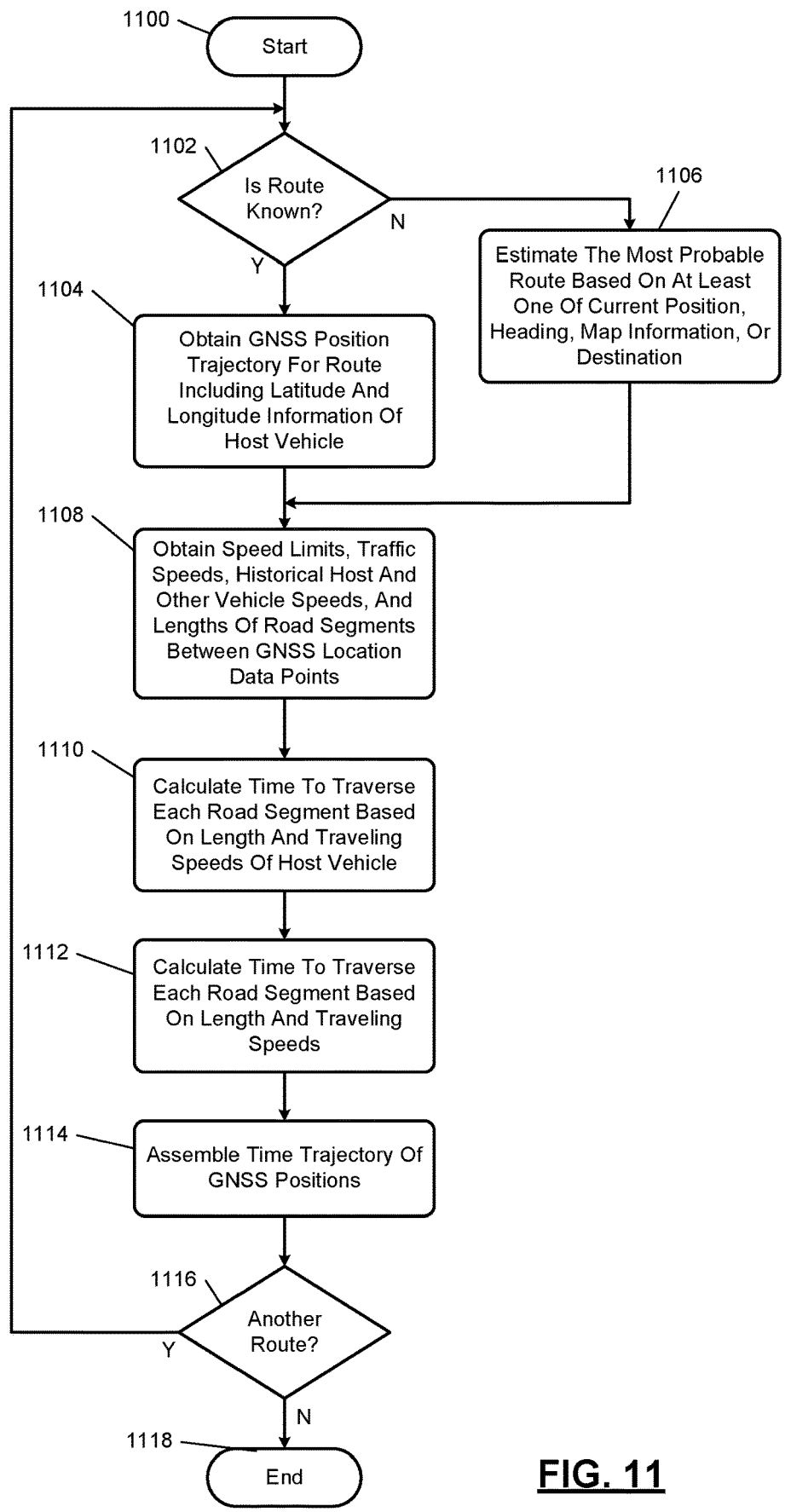
FIG. 11 illustrates a time trajectory method in accordance with the present disclosure.

FIG. 10 shows an overview of a solar load based method. The method may begin at 1000. At 1002, solar loading-based control module 117 performs a time trajectory method, an example of which is shown in FIG. 11. The time trajectory method is performed to determine possible future time trajectories of a host vehicle.

At 1004, the solar load prediction module 202 performs a first solar loading method to determine solar energy source locations with respect to the host vehicle along possible future time trajectories. The locations may be provided in terms of azimuth angles and elevations. At 1006, the solar load prediction module 202 performs a second solar loading method to predict solar load on the host vehicle and occupants at different points and/or during different periods of time for the future time trajectories. Examples of the solar loading methods performed at 1004 and 1006 are provided by FIG. 12. The predicted solar loads on the vehicle for different points in time may be represented as $Q_{solar}(t_0, \ldots, t_0+t_{ph})$ where $t_0$ is an initial time at the origin and $t_{ph}$ is a prediction horizon time in the future. In one embodiment, the predicted solar load is also based on the cabin thermal model and environmental conditions, such as weather conditions.

As an example, methods 13 and 16 may be performed subsequent to operation 1006.

FIG. 11 shows a time trajectory method that may begin at 1100. At 1102, the solar load prediction module 202 may determine whether a route is known. If yes, operation 1104 is performed, otherwise operation 1106 may be performed.

At 1104, the solar load prediction module 202 obtains global navigation satellite system (GNSS) position trajectories for the route including latitude and longitude information of the host vehicle. This may be collected from the navigation system 114.

At 1106, the solar load prediction module 202 estimates the most probable route based on at least one of current host vehicle position (or location), host vehicle heading, map information, or a known host vehicle destination. The route may be a short route or partial route on the way to a destination. For example, the solar load prediction module 202 may know, based on the map information, that the host vehicle is going to continue down a road for a given period of time. As another example, the route estimation may be based on historical data for the host vehicle and/or other vehicles traveling in the same location and the probabilities of the host vehicle taking certain paths. The historical data may include historical behavior for the driver for that time of day and/or past behavior in that location. The route estimation may also be based on current conditions and whether there are any road blocks (e.g., accidents), etc.

At 1108, the solar load prediction module 202 obtains speed limits, traffic speeds, historical host and other vehicle speeds, and lengths of road segments between GNSS location data points. At 1110, the solar load prediction module 202 calculates time to traverse each road segment along the route of concern for the current iteration of this method based on length of the route and traveling speeds of the host vehicle.

At 1112, the solar load prediction module 202 calculates time to traverse each road segment based on the length of the route and traveling speeds. At 1114, the solar load prediction module 202 assembles time trajectory of GNSS positions along the route and associated with the road segments.

At 1116, the solar load prediction module 202 determines whether another route is to be followed. If yes, operation 1102 may be performed, otherwise the method may end at 1118. The method may end at 1118.

Figure 12:
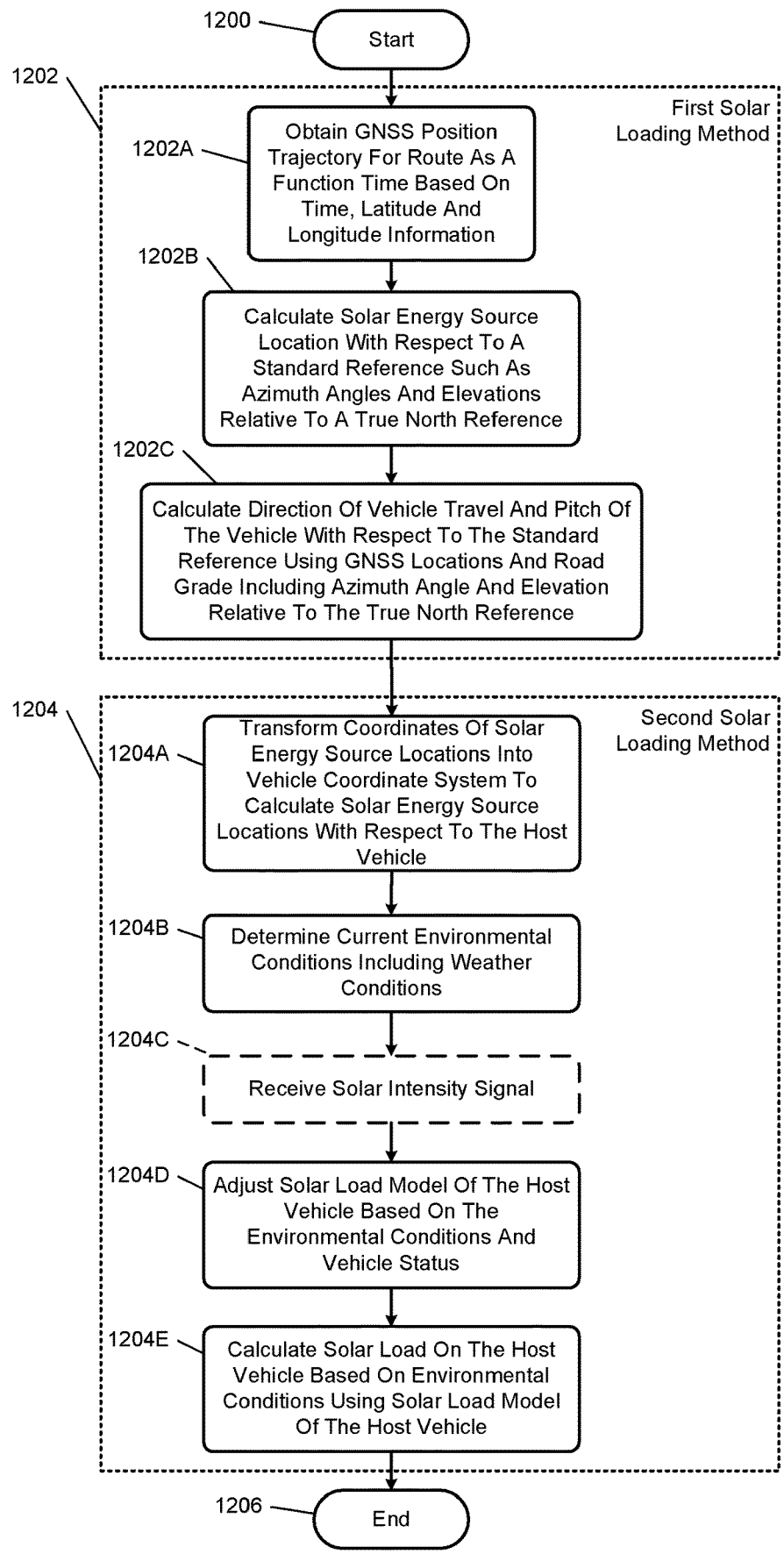
FIG. 12 illustrates first and second solar loading methods in accordance with the present disclosure.

FIG. 12 shows first and second solar loading methods 1202, 1204. The methods may be performed for each available route of concern and/or determined by performing the method of FIG. 11. The first solar loading method may begin at 1200. At 1202A, the solar load prediction module 202 obtains a GNSS position trajectory for a route as a function of time based on time, latitude and longitude information.

At 1202B, the solar load prediction module 202 calculates solar energy source locations with respect to a standard reference such as azimuth angles and elevations relative to a true north reference. As an example, when the route is known, the sun's location and elevation may be determined based on the time of day, the season, and map information.

At 1202C, the solar load prediction module 202 calculates heading of the vehicle and pitch of the host vehicle with respect to the standard reference based on GNSS locations and road grade. This may include azimuth angles and elevations of the host vehicle relative to the true north reference.

At 1204A, the solar load prediction module 202 transforms coordinates of solar energy source locations into a vehicle coordinate system to calculate the solar energy source locations with respect to the host vehicle. At 1204B, the solar load prediction module 202 determines current environmental conditions including weather conditions (e.g., cloud coverage, rainy, clear, snowing, sunny, etc.).

At 1204C, the solar load prediction module 202 may receive one or more solar intensity signals from the one or more solar intensity sensors 111. The outputs of the solar intensity sensors 111 are indicative of the solar loading that can be expected for the current time. The solar load model may be adjusted to (i) provide values for the current time that match the current solar loading for the current time of day, and (ii) adjust future predicted solar loading values.

At 1204D, the solar load prediction module 202 adjusts the solar load model of the host vehicle based on the environmental conditions and vehicle status. The vehicle status may refer to, for example, states of windows, glazing levels (or tinting levels) of windows, screen status levels, etc. The vehicle status may be dynamically changed. The states of cabin thermal actuators may be monitored to determine the vehicle status. At 1204E, the solar load prediction module 202 calculates solar loading on the host vehicle based on the environmental conditions using the solar load model of the host vehicle. The method may end at 1206 or be repeated for another route.

Figure 13:
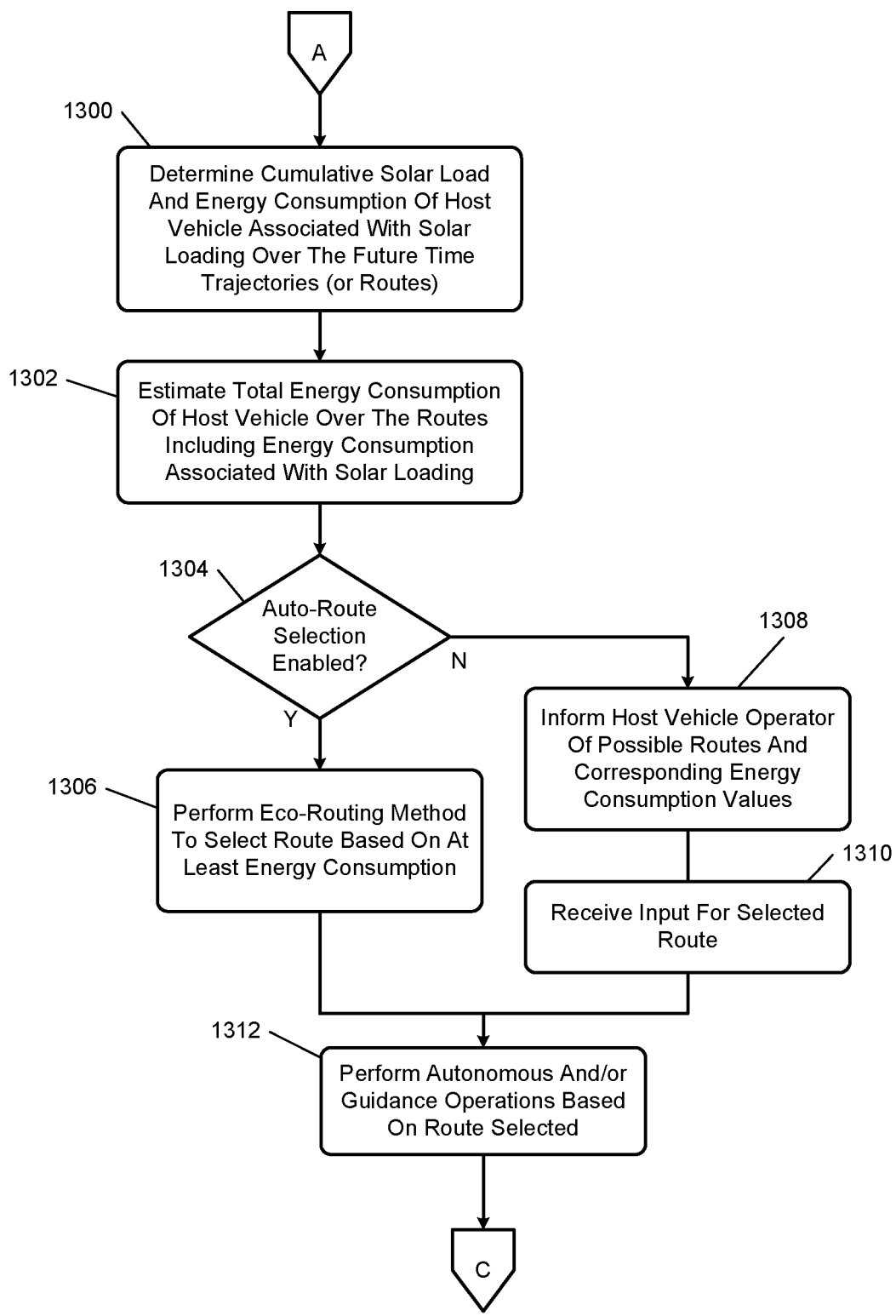
FIG. 13 illustrates an eco-routing based method in accordance with the present disclosure.

FIG. 13 shows an eco-routing based method. At 1300, the solar load prediction module 202 determines cumulative solar load $\oint Q_{solar}$ and energy consumption of the host vehicle associated with solar loading over the determined future time trajectories (or available routes). At 1302, the solar load prediction module 202 estimates the total energy consumption of the host vehicle over the available routes including energy consumption associated with solar loading.

At 1304, the eco-routing module 210 determines whether auto-route selection is enabled. If yes, operation 1306 is performed, otherwise operation 1308 is performed. At 1306, the eco-routing module 210 performed eco-routing method to select route based on at least energy consumption. An example of the eco-routing method is shown in FIG. 14.

At 1308, the eco-routing module 210 informs host vehicle operator (or user) of possible routes and corresponding energy consumption values. The user may then select one of the routes at 1310. This allows the user to make an informed decision when choosing one of the routes.

At 1312, the vehicle control module 109 may then perform autonomous and/or guidance operations based on the selected route. The vehicle control module 109 may control vehicles systems to autonomously follow the selected route and/or provide guidance to the user to follow the selected route. The guidance may, for example, include audible and/or video navigation signals. Following operation 1312, the solar loading-based control module 117 may return to operation 1002 of FIG. 10.

Figure 14:
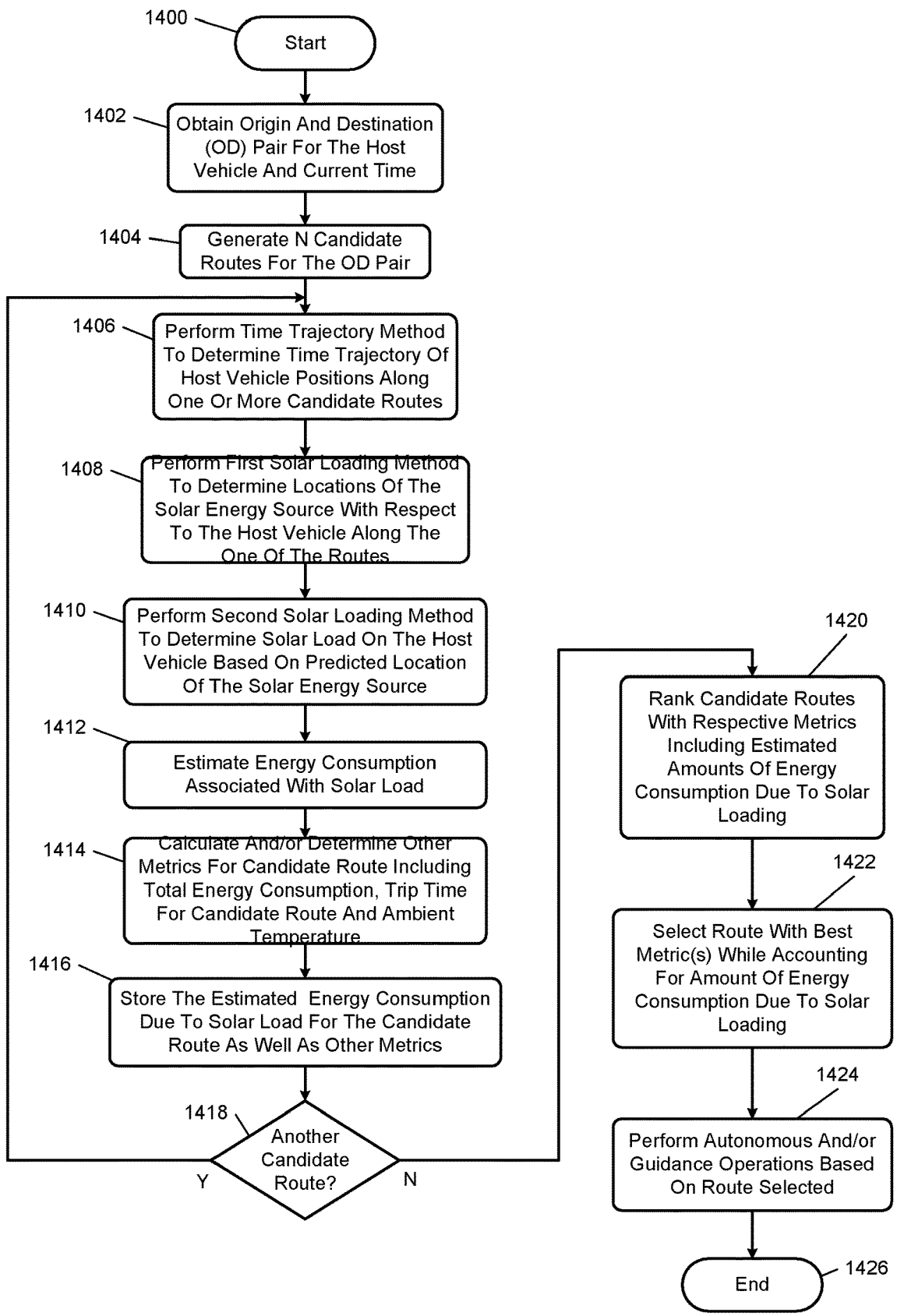
FIG. 14 illustrates an automatic eco-routing based selection method in accordance with the present disclosure.

FIG. 14 shows an automatic eco-routing based selection method. The method may begin at 1400. At 1402, the solar loading-based control module 117 and/or the solar load prediction module 202 obtains the origin and destination (OD) pair for the host vehicle and current time of day.

At 1404, the solar loading-based control module 117 and/or the solar load prediction module 202 generates N candidate routes for the OD pair, as similarly described above.

At 1406, the solar loading-based control module 117 and/or the solar load prediction module 202 performs the time trajectory method to determine the time trajectory of host vehicle positions (or locations) along a first or a next one of the candidate routes (referred to as the current candidate route), depending on the iteration of this operation. This may include performing the method of FIG. 11.

At 1408, the solar load prediction module 202 performs the first solar loading method to determine the locations of the solar energy source with respect to the host vehicle along the current candidate route. This may include operation 1202 of the method of FIG. 12.

At 1410, the solar load prediction module 202 performs the second solar loading method to determine solar loading on the host vehicle based on predicted locations of the solar energy source along the current candidate route. This may include performing operation 1204 of FIG. 12.

At 1412, the eco-routing module 210 estimates energy consumption associated with the solar loading. This is based on the locations of the solar energy source, environmental conditions, vehicle status information, etc.

At 1414, the eco-routing module 210 calculates and/or determines other metrics for current candidate route including total energy consumption, trip time for the current candidate route and ambient temperature.

At 1416, the eco-routing module 210 stores the estimated energy consumption due to solar loading for the current candidate route as well as the other metrics in the memory 110 of FIG. 1. The other metrics may include the total energy consumption, the trip time (or duration of trip), and ambient temperature.

At 1418, the eco-routing module 210 determines whether there is another candidate route. If yes, operation 1406 may be performed, otherwise operation 1420 may be performed.

At 1420, the eco-routing module 210 may rank the candidate routes based on respective metrics including estimated amounts of energy consumption due to solar loading and the other metrics. Energy consumption due to solar loading for each route may be added to other amounts of energy predicted to be consumed for that route to provide a total amount of energy consumption for the route.

At 1422, the eco-routing module 210 selects one of the routes with the best metrics while accounting for the amount of energy consumed due to solar loading. The selection may include weighting the metrics based on importance. In one embodiment, the route with the least amount of energy consumed is selected. In another embodiment, more sophisticated decision logic is used to select a route that takes a minimal amount of time while minimizing energy consumption and while maintaining a high level of user comfort throughout the trip. The route may be selected based on total energy consumption for that route, travel distances, duration of trip, speed limits, etc.

At 1424, the vehicle control module 109 may then perform autonomous and/or guidance operations based on the selected route. The vehicle control module 109 may control vehicles systems to autonomously follow the selected route and/or provide guidance to the user to follow the selected route. The guidance may, for example, include audible and/or video navigation signals. Subsequent to operation 1424, the method may end at 1426.

Figure 15:
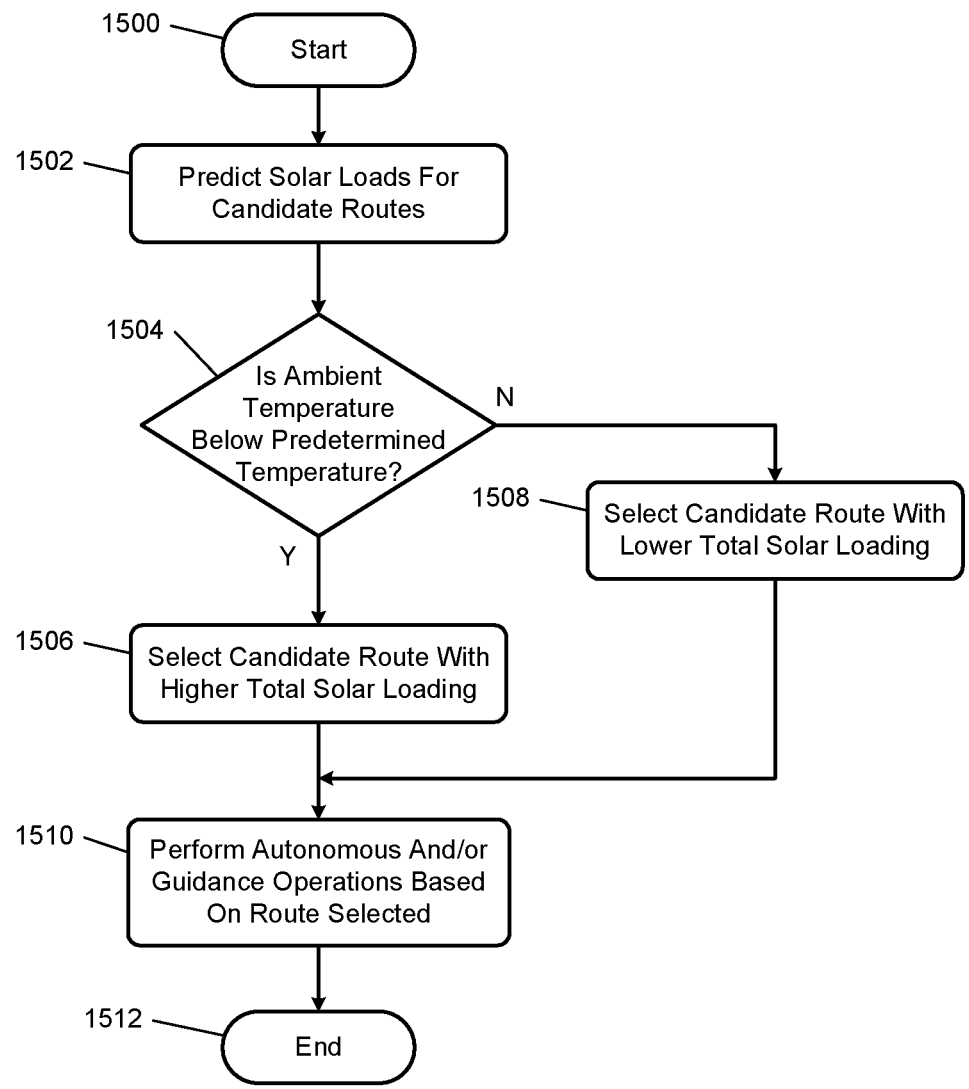
FIG. 15 illustrates another solar-loading-based route selection method in accordance with the present disclosure.

FIG. 15 shows another solar-loading-based route selection method. The method may begin at 1500. At 1502, the solar load prediction module 202 predicts solar loads for candidate routes as described above.

At 1504, the solar loading-based control module 117 determines whether the ambient (or outside) temperature is below a predetermined temperature (e.g., 65° F.). If yes, operation 1506 may be performed, otherwise operation 1508 may be performed.

At 1506, the eco-routing module 210 may select the one of the candidate routes with the highest total solar loading. The eco-routing module 210 may select one of the candidate routes having high total solar loading (not necessarily the highest) and satisfying other criteria such as a time constraint, an energy consumption constraint, etc.

At 1508, the eco-routing module 210 select the candidate route with the lowest total solar loading. The eco-routing module 210 may select one of the candidate routes having low total solar loading (not necessarily the lowest) and satisfying other criteria such as a time constraint, an energy consumption constraint, etc.

At 1510, the vehicle control module 109 may then perform autonomous and/or guidance operations based on the selected route. The vehicle control module 109 may control vehicles systems to autonomously follow the selected route and/or provide guidance to the user to follow the selected route. The guidance may, for example, include audible and/or video navigation signals. Subsequent to operation 1510, the method may end at 1512.

Figure 16:
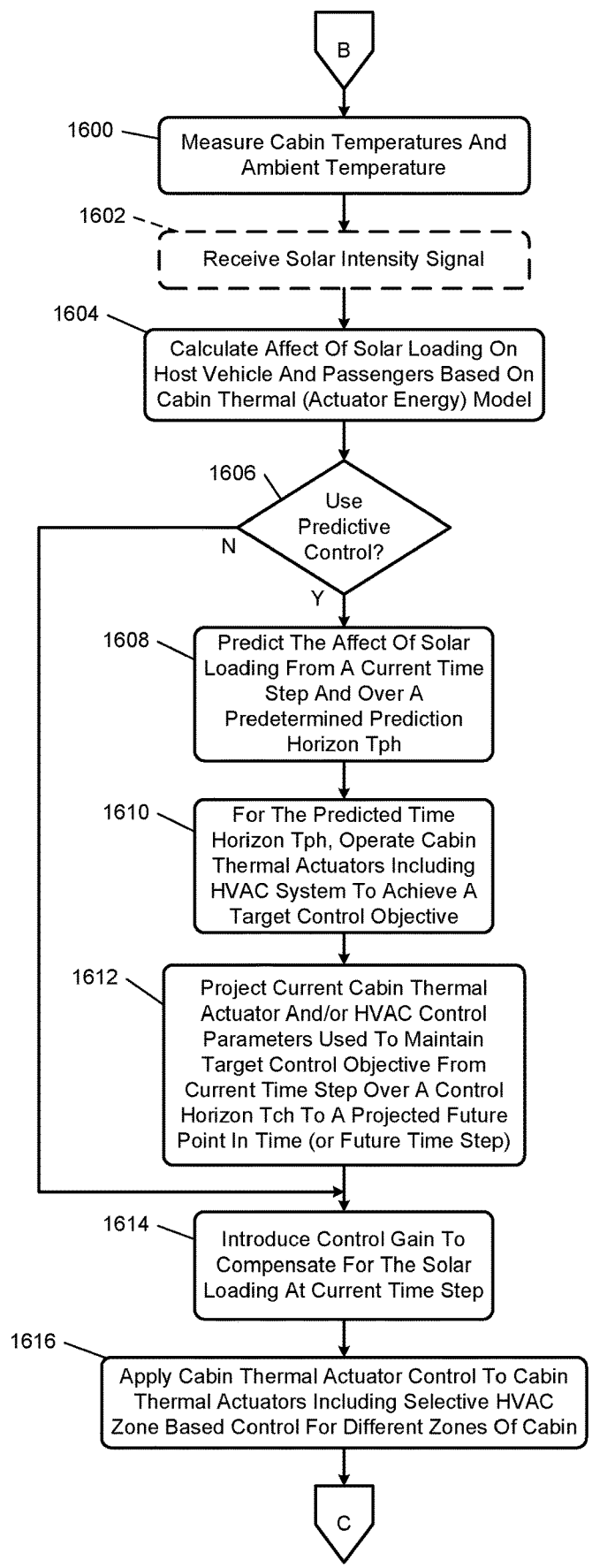
FIG. 16 illustrates a solar loading-based cabin thermal control method in accordance with the present disclosure.

FIG. 16 shows a solar loading-based cabin thermal control method. At 1600, the solar loading-based control module 117 may measure cabin temperatures and ambient temperature via temperature sensors. At 1602, the solar loading-based control module 117 may receive one or more solar intensity signals from the solar intensity sensors 111.

At 1604, the predictive HVAC control module 204 and/or thermal control module 304 may calculate effects of solar loading on the host vehicle and passengers in zones within the cabin of the host vehicle based on the cabin thermal actuator energy model 224.

At 1606, the predictive HVAC control module 204 and/or thermal control module 304 determines whether to use predictive control. If yes, operation 1608 is performed, otherwise operation 1614 is performed. As an example, predictive control predictive control may not be performed when there is not solar loading (it is nighttime), predictive control is disabled, or solar loading is known.

At 1608, the disturbance prediction module 312 predicts the effect of solar loading from a current time step and over a predetermined prediction horizon Tph. The predetermined prediction horizon Tph is greater than zero. The effect of solar load can be on passenger comfort and cabin temperature. The effect of solar load can also be a metric to measure a control objective.

At 1610, the predictive HVAC control module 204 and/or thermal control module 304 for the predicted time horizon Tph, operates cabin thermal actuators including HVAC system to achieve a target control objective. The target control objective may be, for example, to maintain temperatures within the cabin within respective predetermined ranges of target setpoints. The target control objective may include controlling cabin thermal actuators to maintain temperatures of seats, steering wheel and/or other items which the user contacts to be within predetermined ranges of target setpoints.

At 1612, the predictive HVAC control module 204 and/or thermal control module 304 projects current cabin thermal actuator and HVAC control parameters used to maintain target control objective from current time step over a predetermined control horizon Tch to a projected future point in time (or future time step). The predetermined control horizon Tch is greater than zero.

The predictive and control horizons Tph and Tch may be used to provide two moving windows, which are adjusted during each iteration of this method. When shifted, previous prediction that are now outside the windows are dropped and new predictions are generated for future moments in time. This minimizes the amount of calculations during each iteration of this method. When the windows are shifted, time zero (or the current time) is shifted to a new current time and the predicted values are likewise shifted. Models may be used for prediction, where certain inputs are provided to calculate predicted output values. The output values for a timestep may then be used as inputs to the models for a subsequent timestep. When the same output values are provided, then no new values may be generated and/or saved.

As an example, the location of the sun may change in the next five minutes relative to the host vehicle and increased cooling may be needed to maintain a target cabin temperature. If there is no prediction of solar loading, the system may simply be reactive and when the temperature of the cabin increases, the system reacts and increases cooling. When predictive control is enabled, the system is aware that solar loading is about to increase due to the prediction in solar loading over the predicted time horizon Tph. The system may then increase cooling prior to the increase in solar loading to aid in maintaining a flatter cabin temperature curve over time and during changes in solar loading.

The predictive control may include predicting how the cabin temperatures will change with change in cabin thermal actuator control during the Tph period. This may be based on a model that takes into account HVAC system air flow rates into cabin and temperatures. Based on this, the actual control can be adjusted to minimize variations in the cabin temperatures. The predictive control may determine the number of different control decisions and/or actuators to adjust to satisfy the control objective(s). The predictive control may try different HVAC control actuations to determine what happens to, for example, the error of FIG. 3 and then select a best set of HVAC control actuations. The control objectives may also include minimizing an amount of energy used to maintain temperature and/or minimizing an amount of deviation from one or more setpoints.

The HVAC energy model 400 may receive feedback of current states and incorporate inputs from a control module and future predictions from prediction models. If the solar load is to remain the same for a period of time, the HVAC energy model 400 may ignore solar loading predictions for this period of time. If solar load is to change, the HVAC energy model 400 may then take into account solar load predictions. The thermal control module 212 and/or the solar loading-based control module 117 may determine that solar loading is going to change and change control logic to satisfy predetermined constraints.

At 1614, the predictive HVAC control module 204 and/or thermal control module 304 introduces control gain to compensate for the solar loading at current time step. This may include, for example, providing less or more heating if in the winter or providing less or more cooling if in the summer. The gain may be applied to control of cabin thermal actuators including HVAC actuators. At 1616, the predictive HVAC control module 204 applies cabin thermal actuator control including HVAC control to cabin thermal actuators 170 of FIG. 2. This may include selective HVAC zone based control for different zones within the cabin of the host vehicle. Operation 1002 of FIG. 10 may be performed subsequent to operation 1616.

The following examples may be implemented during the method of FIG. 16. The following examples include HVAC predictive control with preview (or prediction) of solar loading. HVAC predictive control may be performed to minimize a metric based on predicted solar loading. If the metric is a performance metric such as temperature deviation, then $$\min_{G} \int_{t}^{t+t_{ph}} (T_c - T_s)^2$$

may be used, where G is a set of control gains (control strategy) that minimizes the performance metric for the given prediction horizon. If the metric is a performance metric such as energy consumption, then $$\min_{G} \int_{t}^{t+t_{ph}} P_{HVAC}$$

may be used. An optimized control gain G may be applied to the HVAC system, as represented by equation 7, where $T_s$ is a setpoint temperature.

$$Q_{HVAC} = k^*(T_c - T_a) - Q_{solar} - G^*(T_c - T_s) \quad (7)$$

The above-described operations of FIGS. 10-16 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The problem of uncertainty in range estimation of a vehicle due to future solar loading is resolved by predicting solar loading on the vehicle over intended routes as disclosed herein. The solar loading may be determined without use of a solar intensity and/or radiation sensor. The solar loading may be predicted based on: vehicle location; solar energy source location predictions; a current determined location of the solar energy source; a vehicle cabin thermal model; weather and other environmental parameters; and other predictions, parameters and models as disclosed herein. The disclosed methodology may be used as a metric to make eco-routing decisions. Lower solar load uncertainty aids in achieving better cabin temperature control (~60% less temperature deviation from setpoint), increased efficiency in a HVAC system (e.g., 0.4-1.00% HVAC energy savings). This is true with as much as ±10% error in solar load prediction.

The above-described examples include both predictive and reactive control to achieve energy efficiency, cabin comfort, and limit component wear. Solar loading predictions and corresponding predictive control aids in maintaining comfort of passengers while not increasing energy usage. Energy savings is also provided through eco-routing and improved range predictions. Predictive solar loading is used to predict energy consumption of an HVAC system and cabin thermal actuators to in turn improve accuracy of vehicle range estimates. The above-described examples include quantifying energy consumption by mathematical and/or data driven models of vehicle and cabin thermal systems including but not limited to: the cabin thermal controls; actuators; heat-flow; solar-radiation effects; initial conditions; historical data; ambient temperature; driving pattern; route features such as road grade, speed limits, average speed limits, average traveling speeds, etc.; user preferences; and other vehicle, route and environmental conditions. The examples include determining predicted solar load and energy consumption of HVAC system over candidate routes to a destination and then selecting a most efficient one of the candidate routes to optimize one or more given metrics including a cost metric (e.g., energy consumption). Energy efficiency may be quantified as the energy to attain and maintain a target state of a cabin thermal system. The effect of solar loading on a host vehicle's energy consumption is calculated for each candidate route along with other metrics affecting energy consumption.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:
1. A solar loading-based system comprising:
a memory configured to store a cabin thermal load model of an interior cabin of a host vehicle and a solar load prediction model;
a disturbance prediction module configured to
receive signals indicative of states of cabin thermal actuators and one or more comfort metrics, and predict an effect of solar loading over a known portion of a predicted route including predicting cabin temperatures based on the solar load prediction model, the states of the cabin thermal actuators, and the one or more comfort metrics, wherein the cabin temperatures refer to different regions within the interior cabin, and wherein the predicted effect of solar loading on the cabin temperatures of the different regions and over the predicted route is based on different predicted locations of a solar energy source relative to the host vehicle along a route;

a cabin temperature estimation module configured, based on the cabin thermal load model, to determine a first comfort metric of the one or more comfort metrics based on the predicted cabin temperatures; and a thermal control module configured to control a plurality of cabin thermal actuators to adjust cabin states, including the first comfort metric, to respective target values based on the predicted effect of solar loading over the known portion of the predicted route, wherein the cabin temperature estimation module is configured to implement a cabin thermal actuator energy model that i) when predicted solar load is to remain the same for a period of time, performs a range extension operation including ignoring solar load predictions for the period of time to increase range of the host vehicle, and ii) when predicted solar load is to change, account for the change in the solar load by changing control logic to satisfy constraints.

2. The solar loading-based system of claim 1, wherein:
the memory is configured to store a cabin disturbance prediction model; and
the cabin disturbance prediction model is configured to predict changes in cabin temperature dues to changes in control of the cabin thermal actuators based on outputs of a plurality of sensors and states of the plurality of cabin thermal actuators.

3. The solar loading-based system of claim 1, further comprising a summer wherein:
the cabin temperature estimation module is configured to determine a plurality of comfort metrics including the one or more comfort metrics based on the predicted cabin temperatures;
the summer is configured to determine a plurality of error values between a plurality of setpoints and the plurality of comfort metrics; and
the thermal control module is configured to control the plurality of cabin thermal actuators to reduce the plurality of error values,
wherein the plurality of comfort metrics include two or more of (i) a temperature within the interior cabin, (ii) an equivalent homogeneous temperature, (iii) a mean radiant temperature, and (iv) a predicted mean vote, and
wherein the predicted mean vote refers to a scalar value indicative of a prediction of how a passenger feels under a future condition of the interior cabin.

4. The solar loading-based system of claim 1, wherein the disturbance prediction module is configured to determine at least one of the predicted cabin temperatures or the one or more comfort metrics based on changes in predicted solar loading provided by the solar load prediction model and states of a thermal system of the interior cabin.

5. The solar loading-based system of claim 1, wherein the first comfort metric is a temperature within the interior cabin, an equivalent homogeneous temperature, a mean radiant temperature, or a predicted mean vote.

6. The solar loading-based system of claim 1, further comprising a summer configured to determine a first error value between a first setpoint and the first comfort metric,
wherein the disturbance prediction module, the cabin temperature estimation module and the thermal control module implement both reactive and predictive control to minimize the first error value over a route traveled by the host vehicle.

7. The solar loading-based system of claim 1, wherein:
the solar load prediction model predicts locations of the solar energy source relative to the host vehicle and along the predicted route and, based on the predicted locations, predicts solar loading over the predicted route of the host vehicle; and
the disturbance prediction module is configured to determine the predicted cabin temperatures based on changes in the predicted solar loading provided by the solar load prediction model.

8. The solar loading-based system of claim 1, wherein the disturbance prediction module is configured to:
based on weather conditions and the solar load prediction model, predict locations of the solar energy source relative to the host vehicle along a route; and
based on the weather conditions, the solar load prediction model, the cabin thermal load model, and the predicted locations of the solar energy source, predict solar loading on at least one of a cabin thermal system of the host vehicle or one or more passengers of the host vehicle.

9. The solar loading-based system of claim 1, wherein the thermal control module is configured to control the plurality of cabin thermal actuators based on one or more performance metrics and one or more constraints.

10. The solar loading-based system of claim 1, wherein:
the disturbance prediction module is configured to predict solar loading from a current timestep and over a predetermined prediction horizon; and
the thermal control module is configured to
control the plurality of cabin thermal actuators to achieve a target control objective over the predetermined prediction horizon,
project current control parameters used to achieve the target control objective over a predetermined control horizon, and
introduce control gain to compensate for the solar loading at the current timestep.

11. The solar loading-based system of claim 1, wherein;
the states of the cabin thermal actuators comprise current and predicted states of the cabin thermal actuators; and
the states of the cabin thermal actuators include the states of the cabin thermal actuators over the known portion of the predicted route.

12. The solar loading-based system of claim 1, wherein the cabin thermal actuators comprise at least one of a window glaze actuator and a window shade actuator.

13. The solar loading-based system of claim 1, wherein the thermal control module is configured to adjust states of the plurality of cabin thermal actuators based on a predicted effect of the solar loading on the cabin temperatures at a predicted future location of the host vehicle prior to the host vehicle arriving at the predicted future location.

14. A solar loading-based method comprising:
storing a cabin thermal load model of an interior cabin of a host vehicle and a solar load prediction model in a memory;
receiving signals indicative of states of cabin thermal actuators and temperatures of the interior cabin;

predicting cabin temperatures based on the solar load prediction model, the states of the cabin thermal actuators, and the temperatures of the interior cabin, wherein the cabin temperatures refer to different regions within the interior cabin, and wherein a predicted effect of solar loading on the cabin temperatures of the different regions and over a predicted route is based on different predicted locations of a solar energy source relative to the host vehicle along the route;

based on the cabin thermal load model, determining a first comfort metric based on the predicted cabin temperatures;

determining a first error value between a first setpoint and the first comfort metric;

controlling a plurality of cabin thermal actuators to reduce the first error value; and implementing a cabin thermal actuator energy model including i) when predicted solar load is to remain the same for a period of time, performing a range extension operation including ignoring solar load predictions for the period of time to increase range of the host vehicle, and ii) when predicted solar load is to change, accounting for the change in the solar load by changing control logic to satisfy constraints.

15. The solar loading-based method of claim 14, further comprising:

storing a cabin disturbance prediction model in the memory; and predicting changes in cabin temperature via the cabin disturbance prediction model due to changes in control of the cabin thermal actuators based on outputs of a plurality of sensors and states of the plurality of cabin thermal actuators.

16. The solar loading-based method of claim 14, further comprising:

determining a plurality of comfort metrics based on the predicted cabin temperatures including the first comfort metric;

determining a plurality of error values between a plurality of setpoints and the plurality of comfort metrics, wherein the plurality of error values include the first error value, wherein the plurality of setpoints including the first setpoint; and controlling the plurality of cabin thermal actuators to reduce the plurality of error values.

17. The solar loading-based method of claim 14, further comprising determining the predicted cabin temperatures based on changes in predicted solar loading provided by the solar load prediction model, wherein the solar load prediction model predicts the solar loading over a route of the host vehicle.

18. The solar loading-based method of claim 14, further comprising:

predicting locations of the solar energy source relative to the host vehicle and along the predicted route and, based on the predicted locations, predicts solar loading over the predicted route of the host vehicle; and determining the predicted cabin temperatures based on changes in the predicted solar loading provided by the solar load prediction model.

19. The solar loading-based method of claim 14, further comprising:

based on weather conditions and the solar load prediction model, predicting locations of the solar energy source relative to the host vehicle along a route; and based on weather conditions, the solar load prediction model, the cabin thermal load model, and the predicted locations of the solar energy source, predicting solar loading on at least one of a cabin thermal system of the host vehicle or one or more passengers of the host vehicle.

* * * * *